(12) United States Patent
Park et al.

(10) Patent No.: US 10,362,449 B2
(45) Date of Patent: Jul. 23, 2019

(54) METHOD FOR RECEIVING BROADCAST/MULTICAST MESSAGE IN WIRELESS COMMUNICATION SYSTEM AND DEVICE THEREFOR

(71) Applicant: LG ELECTRONICS INC., Seoul (KR)

(72) Inventors: Jonghyun Park, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/750,072

(22) PCT Filed: Aug. 4, 2016

(86) PCT No.: PCT/KR2016/008599
§ 371 (c)(1),
(2) Date: Feb. 2, 2018

(87) PCT Pub. No.: WO2017/023128
PCT Pub. Date: Feb. 9, 2017

(65) Prior Publication Data
US 2018/0234807 A1  Aug. 16, 2018

Related U.S. Application Data

(60) Provisional application No. 62/200,649, filed on Aug. 4, 2015.

(51) Int. Cl.
*H04H 20/71* (2008.01)
*H04W 4/06* (2009.01)
(Continued)

(52) U.S. Cl.
CPC .............. *H04W 4/06* (2013.01); *H04J 11/00* (2013.01); *H04W 72/005* (2013.01);
(Continued)

(58) Field of Classification Search
None
See application file for complete search history.

(56) References Cited

U.S. PATENT DOCUMENTS

| 2011/0243009 A1 | 10/2011 | Chandrasekhar et al. |
| 2013/0064162 A1* | 3/2013 | Phan ...................... H04W 8/22 370/312 |

(Continued)

FOREIGN PATENT DOCUMENTS

| EP | 2811764 A1 | 10/2014 |
| WO | 2013/023784 A1 | 2/2013 |
| WO | 2014/015470 A1 | 2/2015 |

*Primary Examiner* — Clemence S Han
(74) *Attorney, Agent, or Firm* — Dentons US LLP

(57) ABSTRACT

A method for a terminal to receive a broadcast/multicast message from a non-serving cell in a wireless communication system according to one embodiment of the present invention comprises: a step of transmitting reception capability information of a terminal to a serving cell; a step of receiving a physical downlink shared channel (PDSCH) from the serving cell; and a step of receiving a broadcast/multicast message from a non-serving cell, wherein whether or not the PDSCH and the broadcast/multicast message are transmitted via a same subframe can be determined on the basis of the reception capability of the terminal.

13 Claims, 12 Drawing Sheets

(51) Int. Cl.
*H04J 11/00* (2006.01)
*H04W 72/00* (2009.01)
*H04W 72/04* (2009.01)
*H04L 12/18* (2006.01)
*H04J 13/00* (2011.01)

(52) U.S. Cl.
CPC ......... *H04W 72/048* (2013.01); *H04J 13/004* (2013.01); *H04J 13/0059* (2013.01); *H04L 12/189* (2013.01)

(56) References Cited

U.S. PATENT DOCUMENTS

| | | | |
|---|---|---|---|
| 2015/0023243 A1* | 1/2015 | Liu | H04L 12/189 370/312 |
| 2015/0078285 A1 | 3/2015 | Kim et al. | |
| 2015/0103724 A1* | 4/2015 | Xu | H04W 4/06 370/312 |
| 2017/0303297 A1* | 10/2017 | Lee | H04W 72/005 |

* cited by examiner

[Fig. 1]
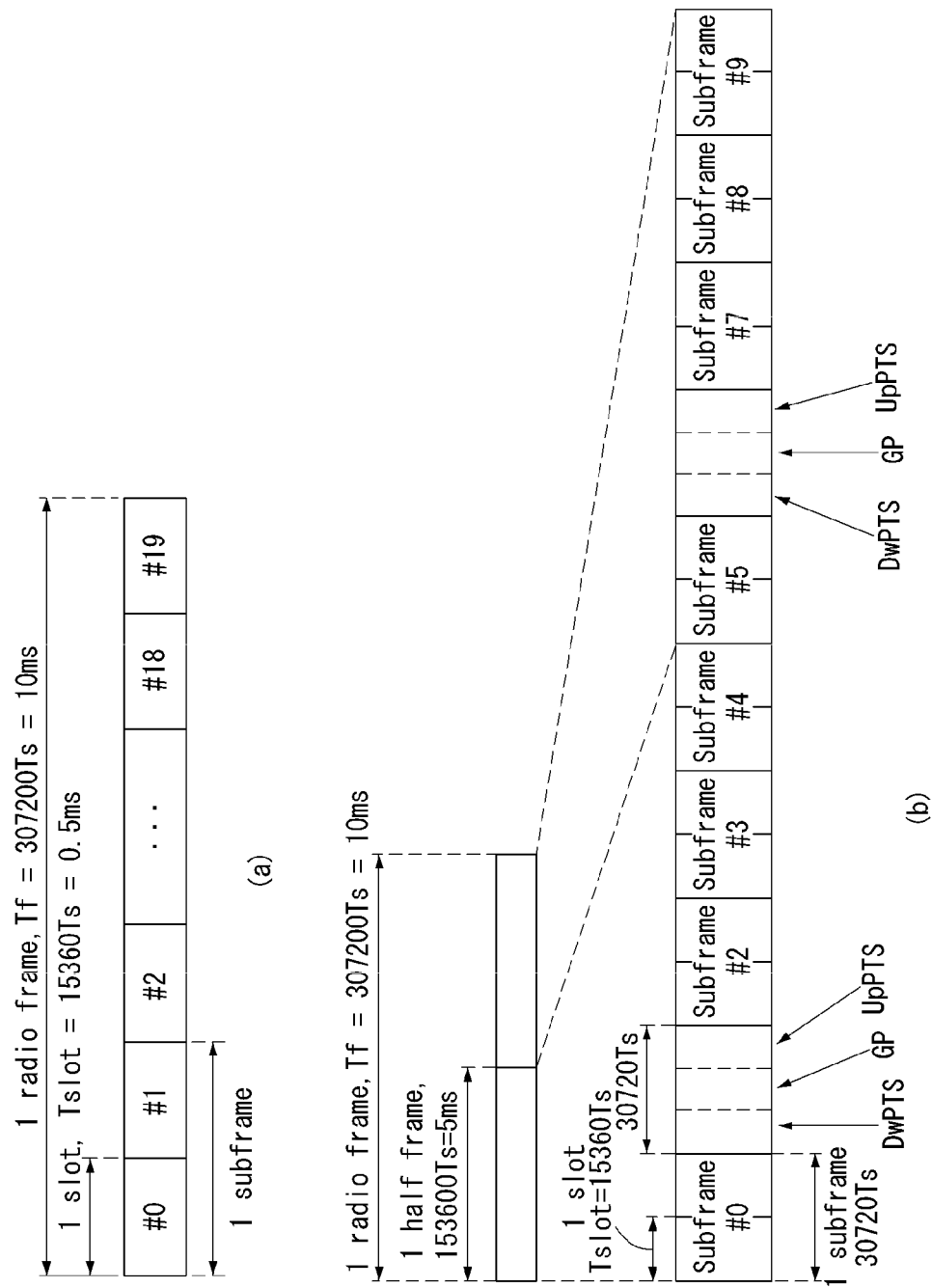

[Fig. 2]
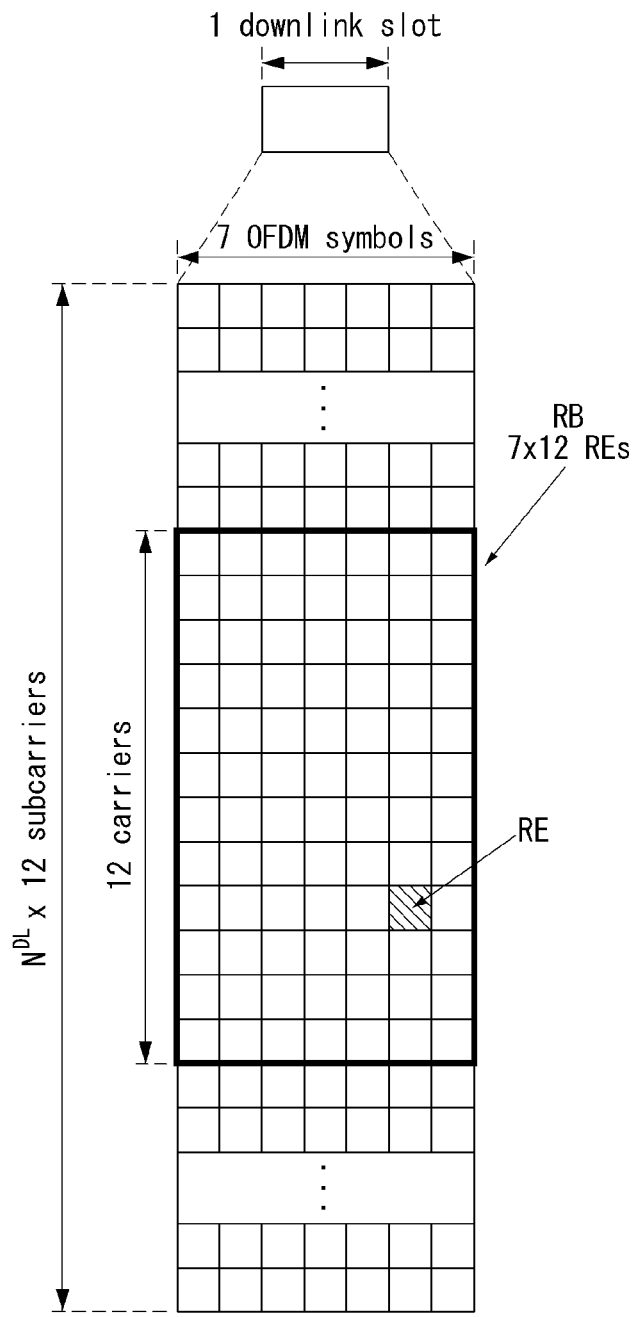

[Fig. 3]
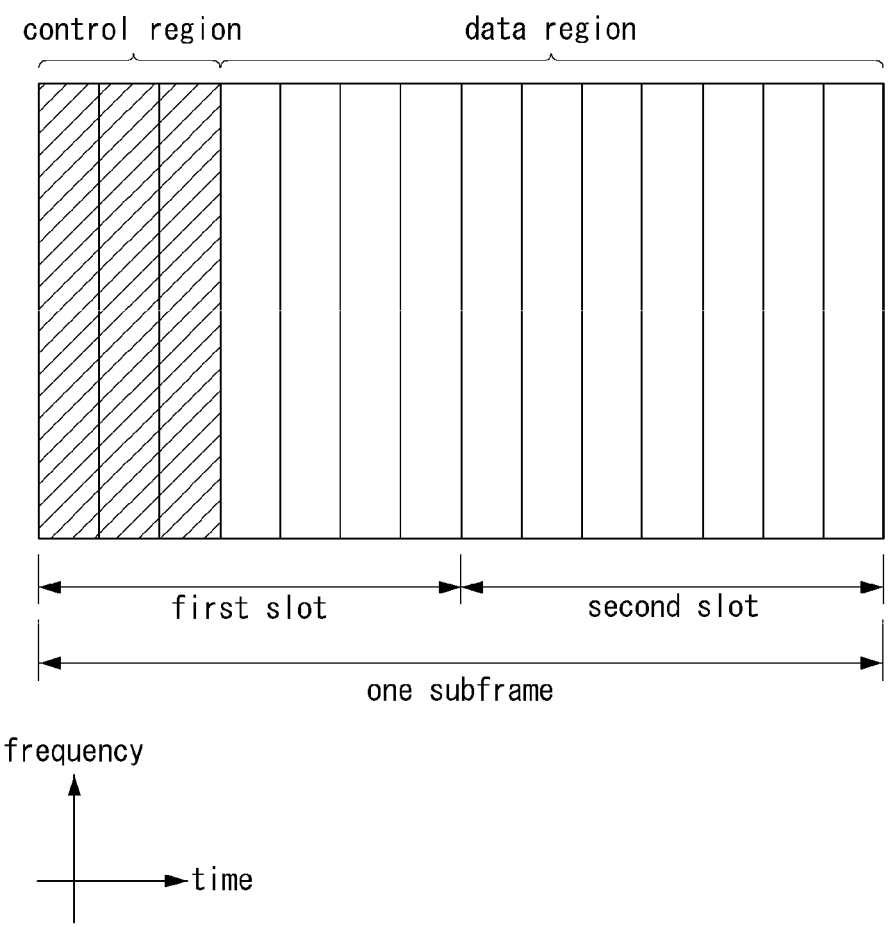

[Fig. 4]
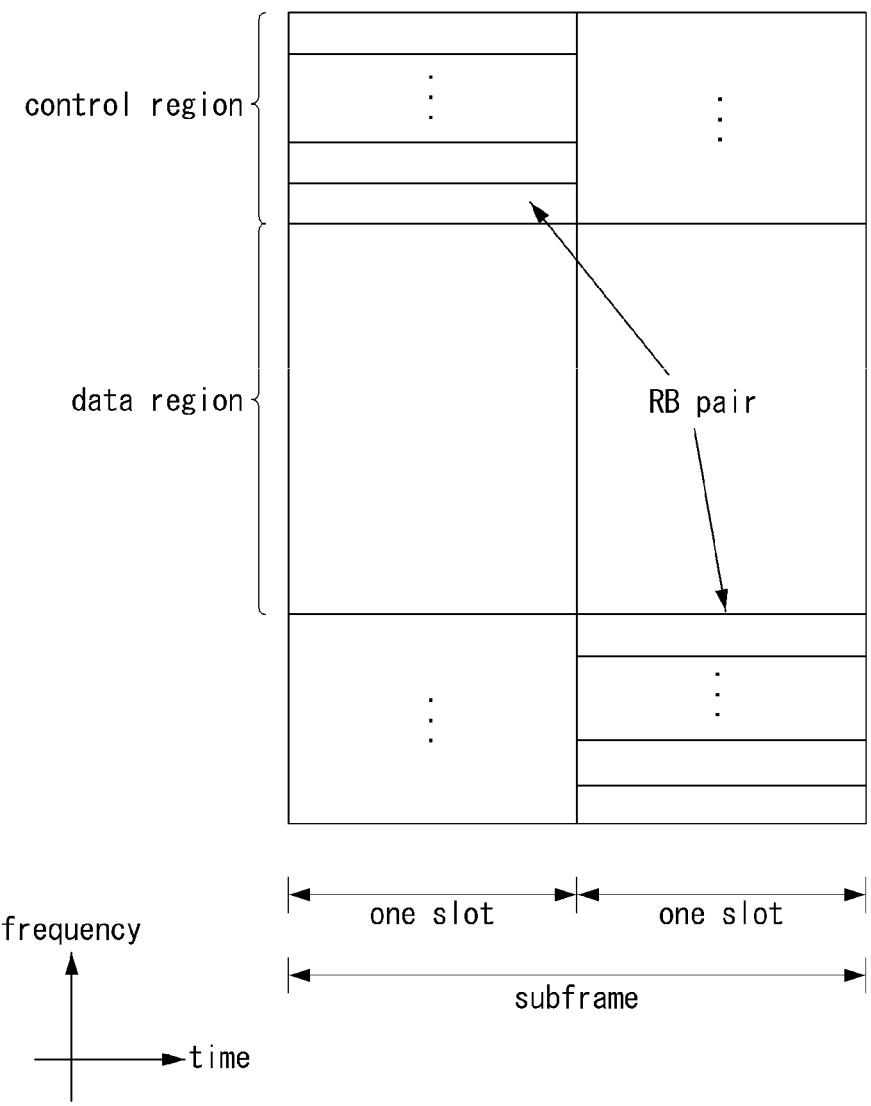

[Fig. 5]
(a) 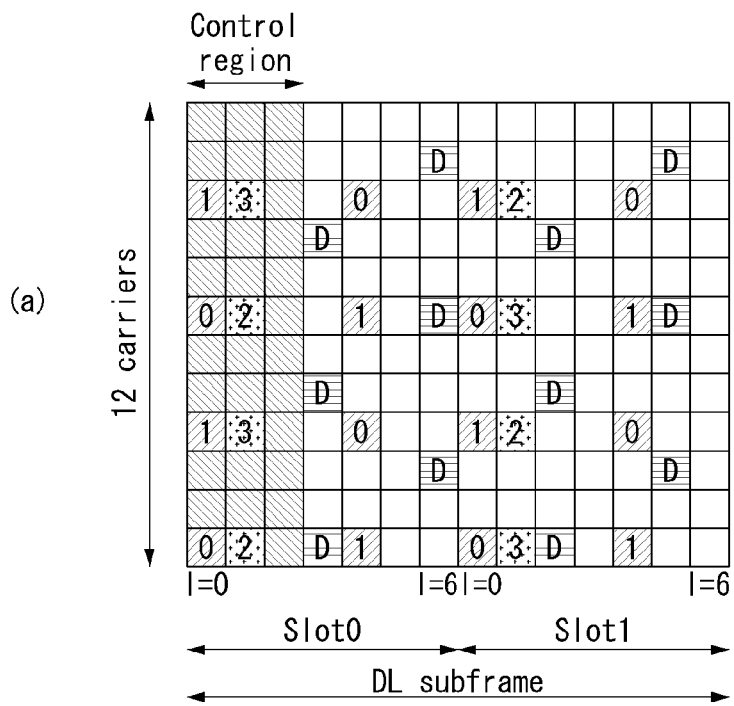
(b) 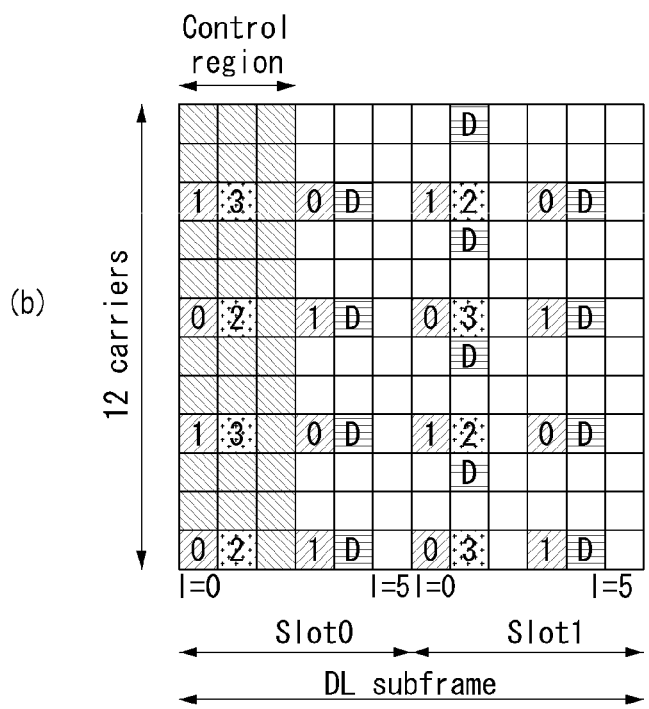

[Fig. 6]
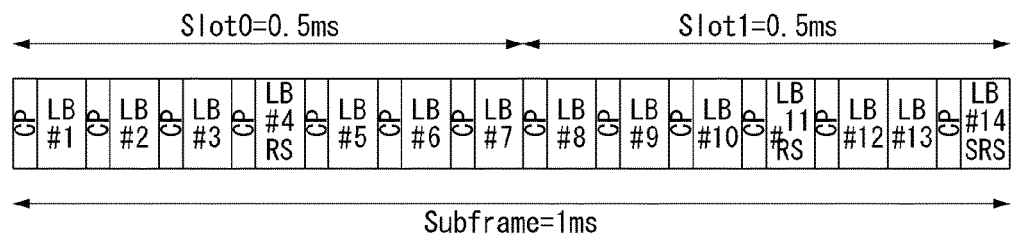

[Fig. 7]
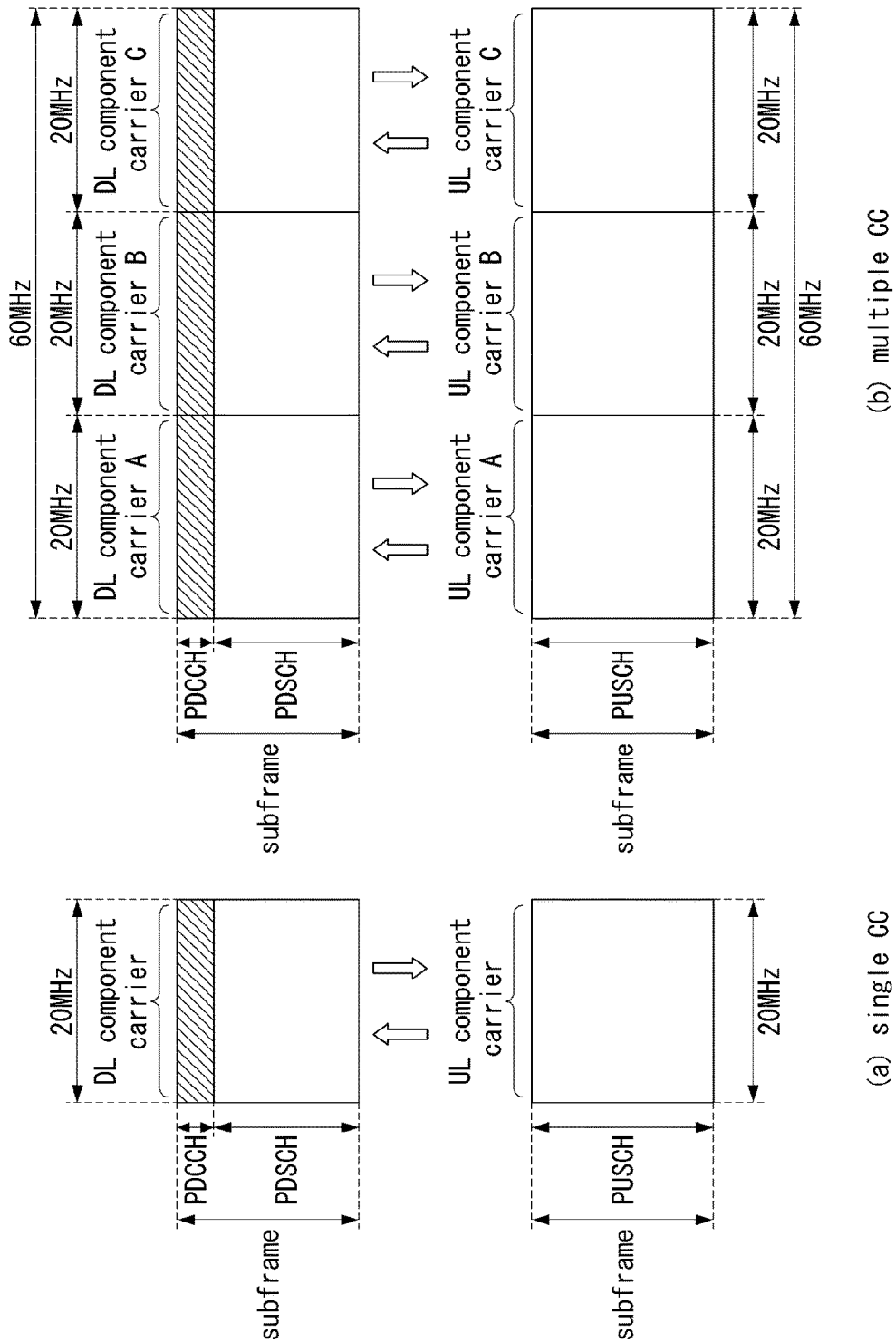

[Fig. 8]
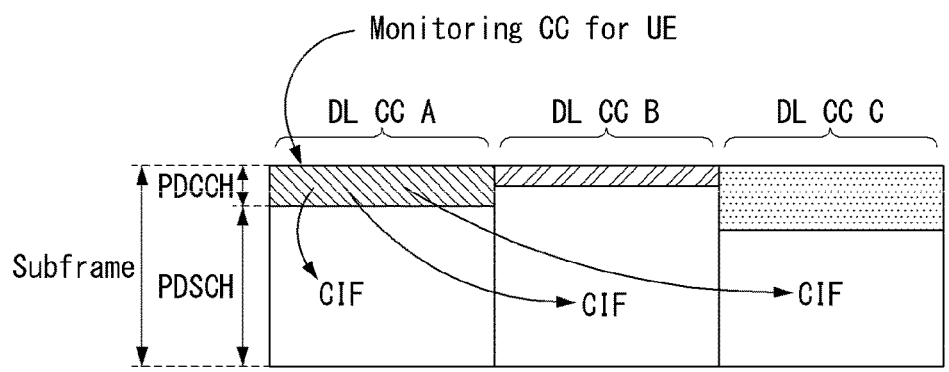
[Fig. 9]
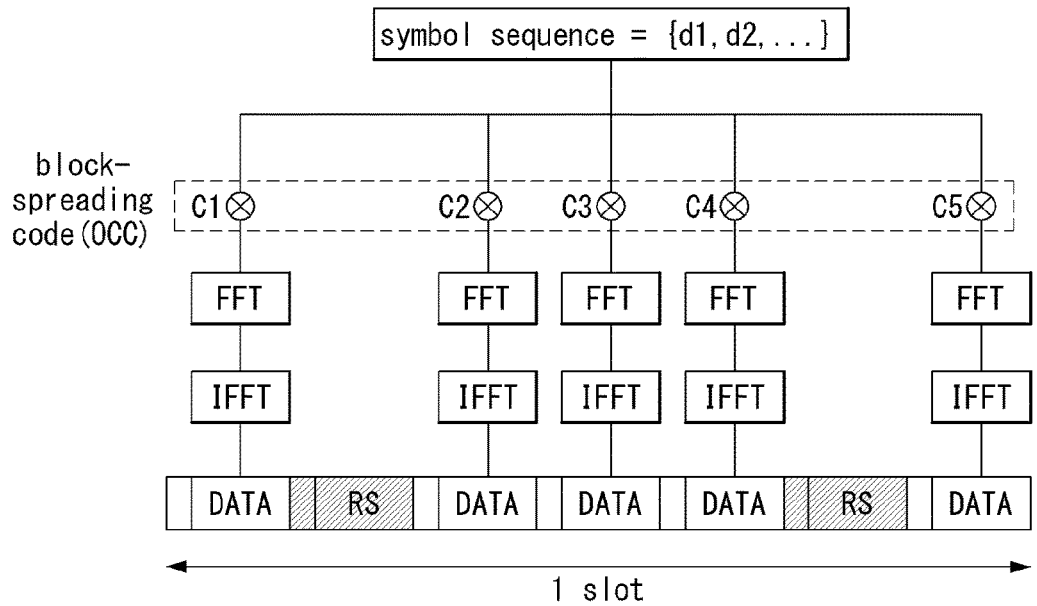

[Fig. 10]
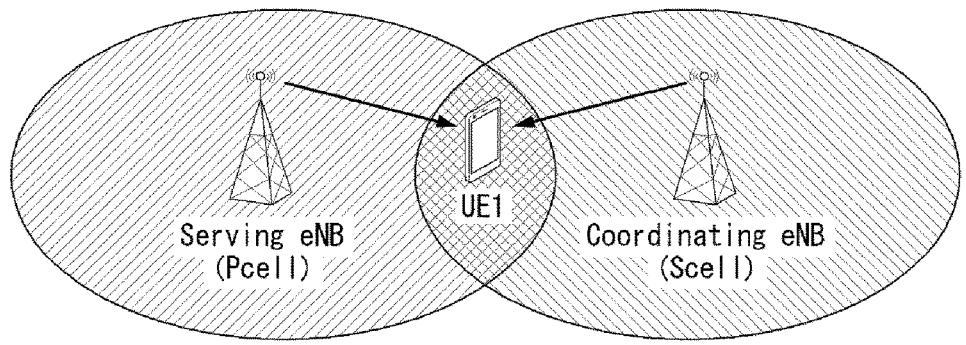
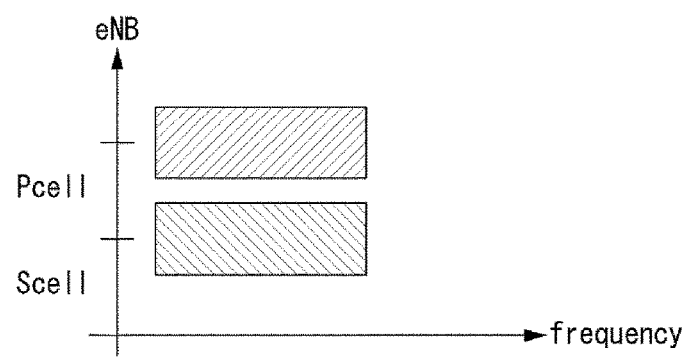
[Fig. 11]
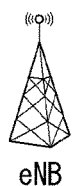
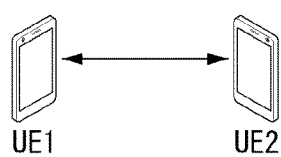

[Fig. 12]
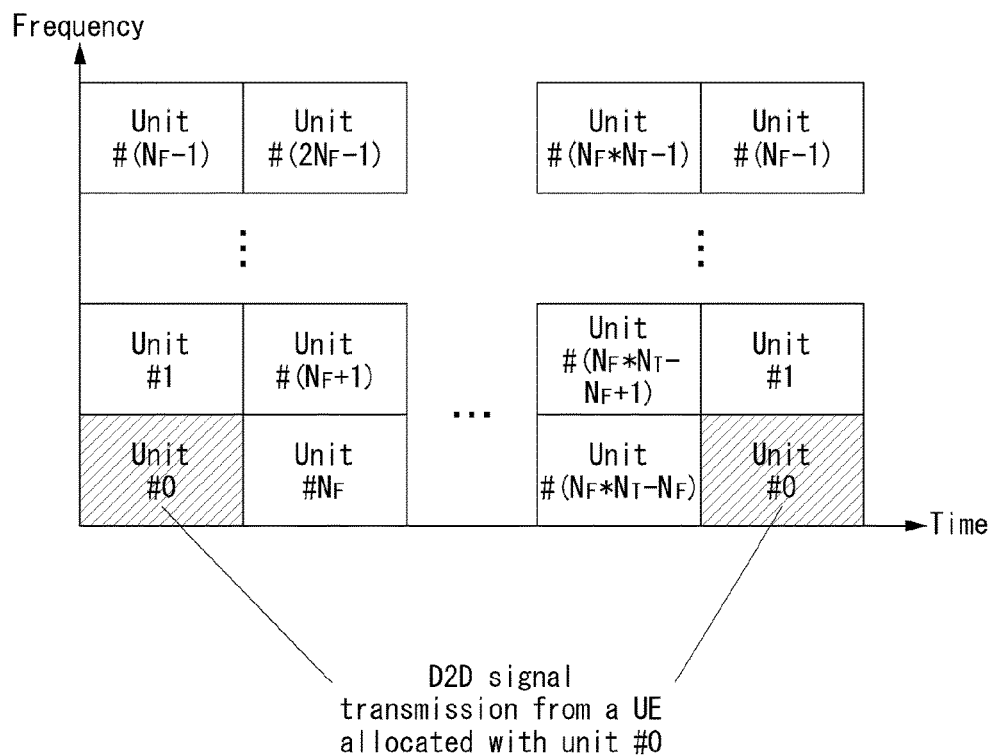
D2D signal transmission from a UE allocated with unit #0

[Fig. 13]
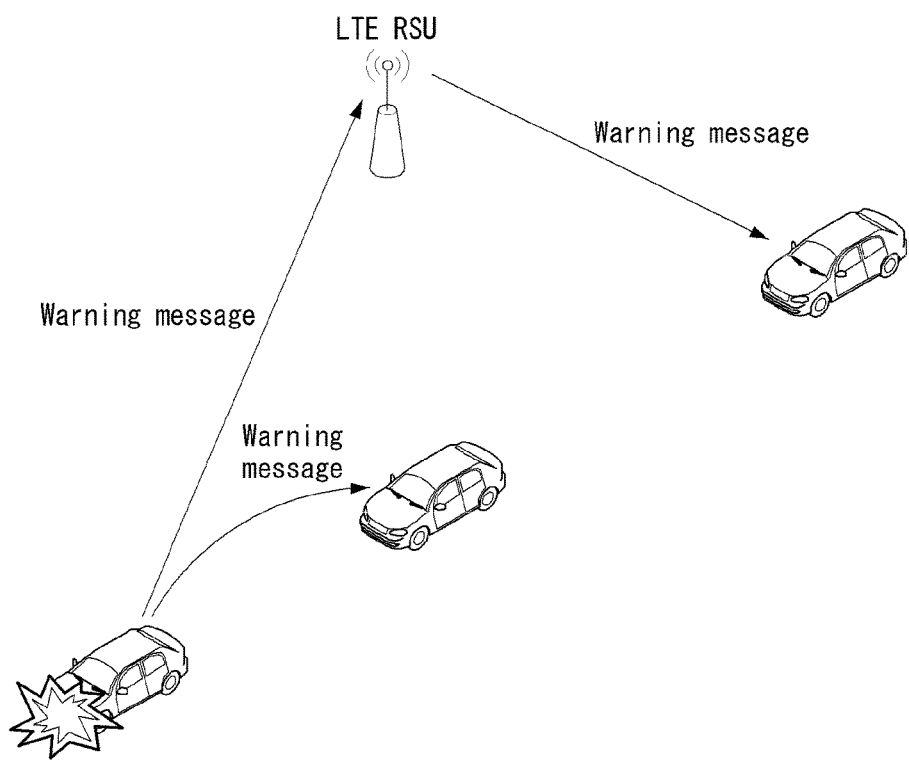
[Fig. 14]
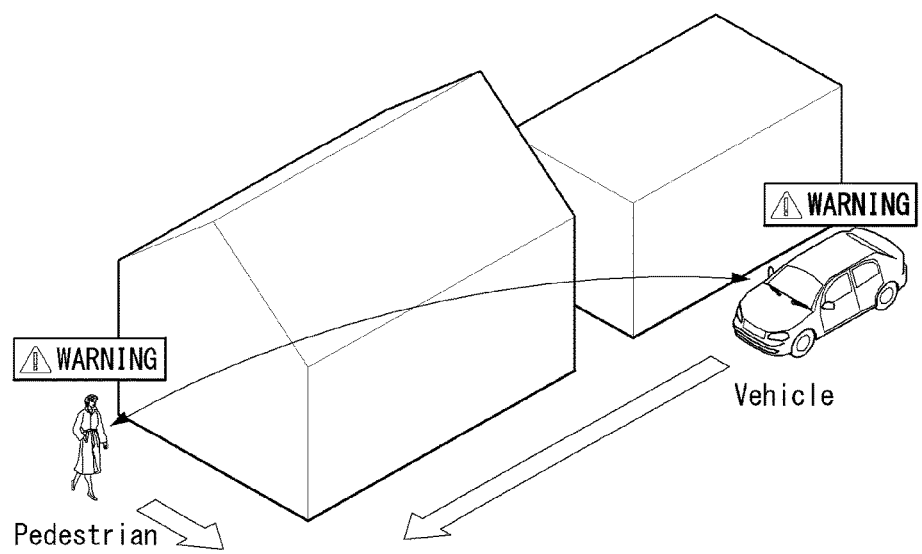

[Fig. 15]
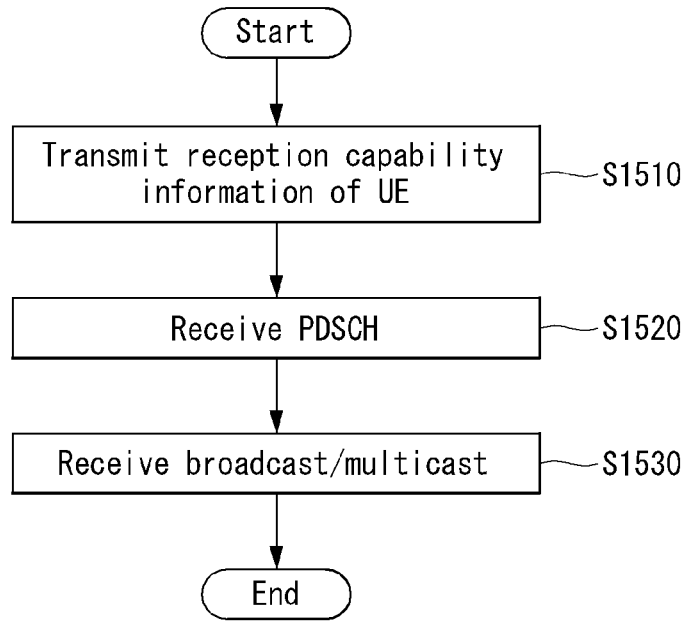
[Fig. 16]
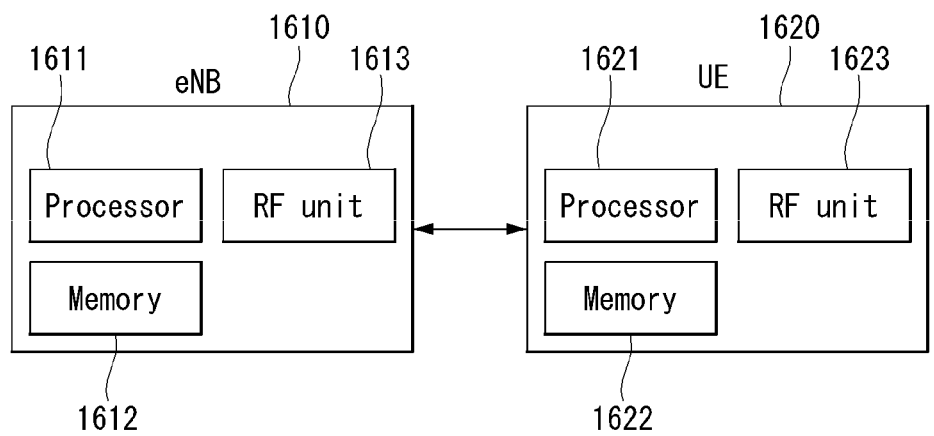

METHOD FOR RECEIVING BROADCAST/MULTICAST MESSAGE IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2016/008599, filed on Aug. 4, 2016, which claims the benefit of U.S. Provisional Applications No. 62/200,649, filed on Aug. 4, 2015, the contents of which are all hereby incorporated by reference herein in their entirety.

TECHNICAL FIELD

The present invention relates to a wireless communication system and, more particularly, to a method for a terminal to receive a broadcast/multicast message from a non-serving cell in a wireless communication system and an apparatus supporting the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

An object of the present invention is to propose an efficient method for enabling all of UEs present within coverage of a corresponding cell to receive a broadcast/multicast message transmitted by a non-serving cell regardless of the reception capability of each UE.

Such an efficient method is also applicable to a wireless communication system supporting a V2X (Vehicle to everything) service.

The technical problems solved by the present invention are not limited to the above technical problems and those skilled in the art may understand other technical problems from the following description.

Technical Solution

A method for a UE to receive a broadcast/multicast message from a non-serving cell in a wireless communication system according to an embodiment of the present invention includes the steps of transmitting reception capability information of the UE to a serving cell; receiving a physical downlink shared channel (PDSCH) from the serving cell; and receiving a broadcast/multicast message from the non-serving cell, wherein whether the PDSCH and the broadcast/multicast message may be transmitted through the same subframe is determined based on the reception capability of the UE.

Furthermore, if the reception capability information of the UE indicates a type 1 indicating that the UE is capable of using a single fast Fourier transform (FFT) chain and a single channel estimation and data decoding chain, the PDSCH and the broadcast/multicast message may be transmitted through different subframes.

Furthermore, the method for a UE to receive a broadcast/multicast message from a non-serving cell in a wireless communication system may further include the step of receiving NDR gap configuration information for configuration of a non-serving-cell data reception (NDR) gap that is an interval in which the PDSCH is not received from the serving cell.

Furthermore, in the method for a UE to receive a broadcast/multicast message, the step of receiving the broadcast/multicast message is performed within the NDR gap.

Furthermore, the NDR gap configuration information may indicate a subframe corresponding to the NDR gap in a bitmap form.

Furthermore, the NDR gap configuration information may indicate at least one of the cycle, period or offset of a subframe corresponding to the NDR gap.

Furthermore, the NDR gap configuration information may additionally indicate the system frame number (SFN) of a frame including the NDR gap.

Furthermore, the method for a UE to receive a broadcast/multicast message from a non-serving cell in a wireless communication system may further include the step of receiving assistance information including a cell-identifier (ID) list including identification information of the non-serving cell sending the broadcast/multicast message and/or a radio network temporary identifier (RNTI) used for the decoding of a control channel of the non-serving cell.

Furthermore, the method for a UE to receive a broadcast/multicast message from a non-serving cell in a wireless communication system may further include the step of receiving transmission scheduling information of the broadcast/multicast message through downlink control information (DCI) masked with the RNTI when the assistance information including the RNTI is received, wherein the step of receiving the broadcast/multicast message may be the step of receiving the broadcast/multicast message transmitted within the NDR gap based on the transmission scheduling information.

Furthermore, the method for a UE to receive a broadcast/multicast message from a non-serving cell in a wireless communication system may further include the step of receiving transmission scheduling information of the broadcast/multicast message from the serving cell, wherein the step of receiving the broadcast/multicast message may be the step of receiving the broadcast/multicast message transmitted within the NDR gap based on the transmission scheduling information.

Furthermore, if the reception capability information of the UE indicates a type 2 indicating that the UE is capable of using a single fast Fourier transform (FFT) chain and a double or multiple channel estimation and data decoding chain, the PDSCH and the broadcast/multicast message may be transmitted through the same subframe, and the non-serving cell transmitting the broadcast/multicast message may be a cell in synchronization with the serving cell.

Furthermore, if the reception capability information of the UE indicates a type 3 indicating that the UE is capable of using a double or multiple fast Fourier transform (FFT) chain and a double or multiple channel estimation and data decoding chain, the PDSCH and the broadcast/multicast message may be transmitted through the same subframe, and the non-serving cell transmitting the broadcast/multicast message may be a cell in synchronization or out of synchronization with the serving cell.

Furthermore, a UE receiving a broadcast/multicast message from a non-serving cell in a wireless communication system according to another embodiment of the present invention includes a radio frequency (RF) unit configured to receive a radio signal and a processor configured to control the RF unit, wherein the UE transmits reception capability information of the UE to a serving cell, receives a physical downlink shared channel (PDSCH) from the serving cell, and receives a broadcast/multicast message from the non-serving cell, and whether the PDSCH and the broadcast/multicast message may be transmitted through the same subframe is determined based on the reception capability of the UE.

Advantageous Effects

In accordance with an embodiment of the present invention, there are effects in that limited network resources can be allocated/used more efficiently because all of UEs present in coverage of a broadcast/multicast transmission cell can receive a V2X broadcast/multicast message regardless of/irrespectively of their reception capability, and thus overall system performance can be improved.

Furthermore, a high-reliability message transmission mechanism is provided in that a message having high priority like a V2X broadcast/multicast message can be received by all of UEs regardless of the reception capability of each UE.

It will be appreciated by persons skilled in the art that that the effects that could be achieved with the present invention are not limited to what has been particularly described hereinabove and other advantages of the present invention will be more clearly understood by a person skilled in the art to which the present invention pertains, from the following detailed description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 1 shows the structure of a radio frame in a wireless communication system to which an embodiment of the present invention may be applied.

FIG. 2 is a diagram illustrating a resource grid for one downlink slot in a wireless communication system to which an embodiment of the present invention may be applied.

FIG. 3 shows the structure of a downlink subframe in a wireless communication system to which an embodiment of the present invention may be applied.

FIG. 4 shows the structure of an uplink subframe in a wireless communication system to which an embodiment of the present invention may be applied.

FIG. 5 shows patterns of reference signals mapped to pairs of downlink resource blocks in a wireless communication system to which an embodiment of the present invention may be applied.

FIG. 6 shows an uplink subframe including sounding reference signal symbols in a wireless communication system to which an embodiment of the present invention may be applied.

FIG. 7 shows an example of component carriers and carrier aggregation in a wireless communication system to which an embodiment of the present invention may be applied.

FIG. 8 shows an example of a structure of a subframe according to cross-carrier scheduling in a wireless communication system to which an embodiment of the present invention may be applied.

FIG. 9 shows one example of generating and transmitting 5 SC-FDMA symbols during one slot in the wireless communication system to which the present invention may be applied FIG. 10 shows a carrier aggregation-based CoMP system in a wireless communication system to which an embodiment of the present invention may be applied.

FIG. 11 shows elements regarding a scheme of direct communication between terminals (D2D).

FIG. 12 shows an embodiment of configuration of resource units.

FIGS. 13 and 14 show V2X communication according to an embodiment of the present invention.

FIG. 15 is a flowchart regarding a broadcast/multicast message reception method of a UE according to an embodiment of the present invention.

FIG. 16 is a block diagram of a wireless communication device according to an embodiment of the present invention.

Mode for Invention

Some embodiments of the present invention are described in detail with reference to the accompanying drawings. A detailed description to be disclosed along with the accompanying drawings are intended to describe some exemplary embodiments of the present invention and are not intended to describe a sole embodiment of the present invention. The following detailed description includes more details in order to provide full understanding of the present invention. However, those skilled in the art will understand that the present invention may be implemented without such more details.

In some cases, in order to avoid that the concept of the present invention becomes vague, known structures and devices are omitted or may be shown in a block diagram form based on the core functions of each structure and device.

In this specification, a base station (BS) (or eNB) has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), or an access point (AP). Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System to which the Present Invention May be Applied

FIG. 1 shows the structure of a radio frame in a wireless communication system to which an embodiment of the present invention may be applied.

3GPP LTE/LTE-A support a radio frame structure type 1 which may be applicable to Frequency Division Duplex (FDD) and a radio frame structure which may be applicable to Time Division Duplex (TDD).

FIG. 1(a) illustrates the radio frame structure type 1. A radio frame consists of 10 subframes. One subframe consists of 2 slots in a time domain. The time taken to send one subframe is called a Transmission Time Interval (TTI). For example, one subframe may have a length of 1 ms, and one slot may have a length of 0.5 ms.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 1(b) illustrates the frame structure type 2. The radio frame structure type 2 consists of 2 half frames. Each of the half frames consists of 5 subframes, a Downlink Pilot Time Slot (DwPTS), a Guard Period (GP), and an Uplink Pilot Time Slot (UpPTS). One subframe consists of 2 slots. The DwPTS is used for initial cell search, synchronization, or channel estimation in UE. The UpPTS is used for channel estimation in an eNB and to perform uplink transmission synchronization with UE. The guard period is an interval in which interference generated in uplink due to the multi-path delay of a downlink signal between uplink and downlink is removed.

In the frame structure type 2 of a TDD system, an uplink-downlink configuration is a rule indicating whether uplink and downlink are allocated (or reserved) to all subframes. Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, "D" is indicative of a subframe for downlink transmission, "U" is indicative of a subframe for uplink transmission, and "S" is indicative of a special subframe including three types of a DwPTS, GP, and UpPTS. An uplink-downlink configuration may be classified into 7 types. The positions and/or number of downlink subframes, special subframes, and uplink subframe are different in each configuration.

A point of time at which a change is performed from downlink to uplink or a point of time at which a change is performed from uplink to downlink is called a switching point. The periodicity of the switching point means a cycle in which an uplink subframe and a downlink subframe are changed is identically repeated. Both 5 ms and 10 ms are supported in the periodicity of a switching point. If the periodicity of a switching point has a cycle of a 5 ms downlink-uplink switching point, the special subframe S is present in each half frame. If the periodicity of a switching point has a cycle of a 5 ms downlink-uplink switching point, the special subframe S is present in the first half frame only.

In all the configurations, 0 and 5 subframes and a DwPTS are used for only downlink transmission. An UpPTS and a subframe subsequent to a subframe are always used for uplink transmission.

Such uplink-downlink configurations may be known to both an eNB and UE as system information. An eNB may notify UE of a change of the uplink-downlink allocation state of a radio frame by transmitting only the index of uplink-downlink configuration information to the UE whenever the uplink-downlink configuration information is changed. Furthermore, configuration information is kind of downlink control information and may be transmitted through a Physical Downlink Control Channel (PDCCH) like other scheduling information. Configuration information may be transmitted to all UEs within a cell through a broadcast channel as broadcasting information.

Table 2 below shows a configuration (length of DwPTS/GP/UpPTS) of a special subframe.

TABLE 2

| | Normal cyclic prefix in downlink | | | Extended cyclic prefix in downlink | | |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| --- | --- | --- | --- | --- | --- | --- |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The structure of a radio frame is only one example. The number of subcarriers included in a radio frame or the number of slots included in a subframe and the number of OFDM symbols included in a slot may be changed in various ways.

FIG. 2 is a diagram illustrating a resource grid for one downlink slot in a wireless communication system to which an embodiment of the present invention may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12×7 resource elements. The number of RBs $N^{DL}$ included in a downlink slot depends on a downlink transmission bandwidth.

The structure of an uplink slot may be the same as that of a downlink slot.

FIG. 3 shows the structure of a downlink subframe in a wireless communication system to which an embodiment of the present invention may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource allocation and transport format of a downlink shared channel (DL-SCH) (this is also called an "downlink grant"), resource allocation information about an uplink shared channel (UL-SCH) (this is also called a "uplink grant"), paging information on a PCH, system information on a DL-SCH, the resource allocation of a higher layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some contiguous CCEs. A CCE is a logical allocation unit that is used to provide a PDCCH with a coding rate according to the state of a radio channel. A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches a Cyclic Redundancy Check (CRC) to control information. A unique identifier (a Radio Network Temporary Identifier (RNTI)) is masked to the CRC depending on the owner or use of a PDCCH. If the PDCCH is a PDCCH for specific UE, an identifier unique to the UE, for example, a Cell-RNTI (C-RNTI) may be masked to the CRC. If the PDCCH is a PDCCH for a paging message, a paging indication identifier, for example, a Paging-RNTI (P-RNTI) may be masked to the CRC. If the PDCCH is a PDCCH for system information, more specifically, a System Information Block (SIB), a system information identifier, for example, a System Information-RNTI (SI-RNTI) may be masked to the CRC. A Random Access-RNTI (RA-RNTI) may be masked to the CRC in order to indicate a random access response which is a response to the transmission of a random access preamble by UE.

FIG. 4 shows the structure of an uplink subframe in a wireless communication system to which an embodiment of the present invention may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Reference Signal (RS)

In a wireless communication system, data is transmitted via a wireless channel, and thus, a signal may be distorted during transmission. In order for a receiving end to accurately receive, distortion of the received signal should be corrected using channel information. In order to detect channel information, a method of transmitting a signal known to both a transmitting side and the receiving side and a method of detecting channel information using a degree of distortion when a signal is transmitted through a channel are largely used. The afore-mentioned signal is called a pilot signal or a reference signal (RS).

Also, recently, most mobile communication systems uses a method for enhancing transmission/reception data efficiency by adopting multiple transmit antennas and multiple receive antennas in order to transmit a packet, moving away from the conventional use of a single transmit antenna and a single receive antenna. When data is transmitted or received using multiple input/output antennas, a channel state between the transmit antennas and the receive antennas should be detected to accurately receive a signal. Therefore, each transmit antenna should have a separate reference signal.

In a mobile communication system, an RS may be classified into two types according to its purpose. There are an RS for acquiring channel information and an RS used for data demodulation. The former aims at acquiring channel information by a UE to downlink, and thus, the former RS should be transmitted in a broadband, and even a UE, which does not receive downlink data in a specific subframe, should receive and measure the RS. Also, the former RS is used for measurement such as handover, or the like. The latter RS is an RS transmitted together in a corresponding resource when a base station (BS) transmits it to downlink. Upon receiving the corresponding RS, the UE may be able to perform channel estimation, and thus, demodulate data. The latter RS should be transmitted in a region in which data is transmitted.

Five types of downlink RS are defined as follows.
CRS: cell-specific reference signal
MBSFN RS: multicast-broadcast single-frequency network reference signal
UE-specific RS or demodulation RS (DM-RS)
PRS: positioning reference signal
CSI-RS: channel state information reference signal One RS is transmitted for each downlink antenna port.

The CRS is transmitted in every downlink subframe within a cell supporting PDSCH transmission. The CRS is transmitted in one or more of antenna ports 0 to 3. The CRS is defined only in $\Delta f=15$ kHz.

The MBSFN RS is transmitted in an MBSFN region of an MBSFN subframe only when a physical multicast channel (PMCH) is transmitted. The MBSFN RS is transmitted in antenna port 4. The MBSFN RS is defined only in an extended CP.

The DM-RS is supported for transmission of a PDSCH and is transmitted in antenna ports p=5, p=7, p=8 or p=7, 8, . . . , u+6. Here, u is the number of layers used for transmission of the PDSCH. The DM-RS is present and valid for PDSCH demodulation only when PDSCH transmission is associated in a corresponding antenna port. The DM-RS is transmitted only in a resource block (RB) to which the corresponding PDSCH is mapped.

Regardless of the antenna port p, when any one of a physical channel and a physical signal other than the DM-RS is transmitted using an RE of the same index pair (k,l) in which the DM-RS is transmitted, the DM-RS is not transmitted in the RE of the corresponding index pair (k,l).

The PRS is transmitted only in a resource block within a downlink subframe set for PRS transmission.

When both a general subframe and an MBSFN subframe are set as positioning subframes within one cell, OFDM symbols within the MBSFN subframe set for PRS transmission use the same CP as that of subframe #0. When only the MBSFN subframe is set as a positioning subframe within one cell, OMDM symbols set for the PRS within the MBSFN region of the corresponding subframe use an extended CP.

Within the subframe set for PRS transmission, a starting point of an OFDM symbol set for PRS transmission is the same as a starting point of a subframe having the same CP length as that of every OFDM symbol set for the RPS transmission.

The PRS is transmitted in antenna port 6.

The PRS is not mapped to an RE (k,l) allocated to a physical broadcast channel (PBCH), a PSS, or SSS, regardless of the antenna port p.

The PRS is defined only in $\Delta f=15$ kHz.

The CSI-RS is transmitted in 1, 2, 4, or 8 number of antenna ports using p=15, p=15, 16, p=15, . . . , 18, and p=15, . . . , 22, respectively.

The CSI-RS is defined only in $\Delta f=15$ kHz.

The reference signal (RS) will be described in more detail.

The CRS is an RS for obtaining information regarding a state of a channel shared by every terminal within a cell and measuring handover, or the like. The DM-RS is used for data demodulation only for a specific UE. Information for demodulation and channel measurement may be provided using such reference signals. That is, the DM-RS is used only for data demodulation, and the CRS is used for both purposes of channel information obtaining and data demodulation.

The receiving side (i.e., UE) measures a channel state from the CRS, and feeds back an indicator related to channel quality such as a CQI (Channel Quality Indicator), a PMI (Precoding Matrix Index), a PTI (Precoding Type Indicator) and/or an RI (Rank Indicator) to the transmitting side (i.e., Base Station). Meanwhile, a reference signal related to feedback of channel state information (CSI) may be defined as a CSI-RS.

The DM-RS may be transmitted through resource elements when data on a PDSCH is required to be demodulated. The UE may receive whether a DM-RS is present through a higher layer, and may be valid only when the corresponding PDSCH is mapped. The DM-RS may be called a UE-specific RS or a demodulation RS (DMRS).

FIG. 5 illustrates a reference signal pattern mapped to a downlink resource block pair in a wireless communication system to which an embodiment of the present invention may be applied.

Referring to FIG. 5, a downlink resource block pair, that is, a unit in which a reference signal is mapped unit, may be represented in the form of one subframe in a time domain X 12 subcarriers in a frequency domain. That is, in a time axis (i.e., x axis), one resource block pair has a length of 14 OFDM symbols in the case of a normal Cyclic Prefix (CP) (FIG. 10(a)) and has a length of 12 OFDM symbols in the case of an extended CP (FIG. 10(b)). In the resource block lattice, Resource Elements (REs) indicated by "0", "1", "2", and "3" mean the positions of the CRSs of antenna port indices "0", "1", "2", and "3", and REs indicated by "D" denotes the position of a DRS.

A CRS is described in detail below. The CRS is used to estimate the channel of a physical antenna and is a reference signal which may be received by all UEs located in a cell in common. The CRS is distributed to the entire frequency bandwidth. Furthermore, the CRS may be used for Channel Quality Information (CQI) and data demodulation.

The CRS is defined in various formats depending on an antenna array on the transmission side (i.e., an eNB). In a 3GPP LTE system (e.g., release-8), various antenna arrays are supported, and the transmission side of a downlink signal has three types of antenna arrays, such as 3 single transmission antennas, 2 transmission antennas, and 4 transmission antennas. If an eNB uses a single transmission antenna, reference signals for a single antenna port are arrayed. If an eNB uses 2 transmission antennas, reference signals for 2 transmission antenna ports are arrayed using a Time Division Multiplexing (TDM) method and/or a Frequency Division Multiplexing (FDM) method. That is, different time resources and/or different frequency resources are allocated so that reference signals for 2 antenna ports are distinguished from each other.

Furthermore, if an eNB uses 4 transmission antennas, reference signals for 4 transmission antenna ports are arrayed using the TDM and/or FDM methods. Channel information measured by the reception side (i.e., UE) of a downlink signal may be used to demodulate data transmitted using a transmission method, such as single transmission antenna transmission, transmission diversity, closed-loop spatial multiplexing, open-loop spatial multiplexing, or an multi-User-multi-input/output (MIMO) antennas.

If a multi-input/output antenna is supported, when a reference signal is transmitted by a specific antenna port, the reference signal is transmitted in the positions of resource elements specified depending on the pattern of the reference signal and is not transmitted in the positions of resource elements specified for other antenna ports. That is, reference signals between different antennas do not overlap.

Sounding Reference Signal (SRS)

An SRS is mostly used in the measurement of channel quality in order to perform uplink frequency-selective scheduling and is not related to the transmission of uplink data and/or control information, but the present invention is not limited thereto. The SRS may be used for various other purposes for improving power control or various startup functions of UEs which have not been recently scheduled. The startup functions may include an initial Modulation and Coding Scheme (MCS), initial power control for data transmission, a timing advance, and frequency semi-selective scheduling, for example. In this case, the frequency semi-selective scheduling means selectively allocating a frequency resource to the first slot of a subframe and pseudo-randomly hopping to another frequency in the second slot of the subframe and allocating frequency resources.

Furthermore, the SRS may be used to measure downlink channel quality, assuming that a radio channel is reciprocal between uplink and downlink. Such an assumption is particularly valid when the same frequency spectrum is shared between uplink and downlink and in Time Division Duplex (TDD) systems separated in a time domain.

The subframes of an SRS transmitted by UE within a cell may be represented by a cell-specific broadcasting signal. A 4-bit cell-specific parameter "srsSubframeConfiguration" indicates 15 available subframe arrays in which an SRS may be transmitted though respective radio frames. In accordance with such arrays, the flexibility of control of SRS overhead may be provided according to a deployment scenario.

A sixteenth array completely turns off the switch of an SRS within a cell, which is mostly suitable for a serving cell which provides service to high-speed UEs.

FIG. 6 illustrates an uplink subframe including the symbols of a Sounding Reference Signal (SRS) in a wireless communication system to which an embodiment of the present invention may be applied.

Referring to FIG. 6, an SRS is always transmitted through the last SC-FDMA symbol in an arrayed subframe. Accordingly, an SRS and DMRS are placed in different SC-FDMA symbols.

The transmission of PUSCH data is not permitted in a specific SC-FDMA symbol for SRS transmission. As a result, if sounding overhead is the highest, that is, although an SRS symbol is included in all subframes, sounding overhead does not exceed about 7%.

Each SRS symbol is generated based on a base sequence (i.e., a random sequence or a sequence set based on Zadoff-Ch (ZC)) regarding a given time unit and frequency bandwidth. All UEs within the same cell use the same base sequence. In this case, the transmissions of SRSs from a plurality of UEs within the same cell in the same frequency bandwidth and the same time are orthogonal to each other by different cyclic shifts of a base sequence and are distinguished from each other.

SRS sequences from different cells may be distinguished from each other because different base sequences are allocated to respective cells, but orthogonality between the different base sequences is not guaranteed.

General Carrier Aggregation

A communication environment taken into consideration in embodiments of the present invention includes a multi-carrier support environment. That is, a multi-carrier system or Carrier Aggregation (CA) system that is used in an embodiment of the present invention refers to a system in which one or more Component Carriers (CCs) having a smaller bandwidth than a target bandwidth are aggregated and used when the target wideband is configured in order to support a wideband.

In an embodiment of the present invention, a multi-carrier means of an aggregation of carriers (or a carrier aggregation). In this case, an aggregation of carriers means both an aggregation between contiguous carriers and an aggregation between discontiguous (or non-contiguous) carriers. Furthermore, the number of CCs aggregated between downlink and uplink may be different. A case where the number of downlink CCs (hereinafter called "DL CCs") and the number of uplink CCs (hereinafter called "UL CCs") are the same is called a symmetric aggregation. A case where the number of DL CCs is different from the number of UL CCs is called an asymmetric aggregation. Such the term of a carrier aggregation may be replaced with terms, such as a carrier aggregation, bandwidth aggregation, or spectrum aggregation.

An object of a carrier aggregation configured by aggregating two or more component carriers is to support up to a 100 MHz bandwidth in an LTE-A system. When one or more carriers having a smaller bandwidth than a target bandwidth are aggregated, the bandwidth of the aggregated carriers may be restricted to a bandwidth which is used in an existing system in order to maintain backward compatibility with an existing IMT system. For example, in an existing 3GPP LTE system, {1.4, 3, 5, 10, 15, 20} MHz bandwidths may be supported. In a 3GPP LTE-advanced system (i.e., LTE-A), bandwidths greater than the bandwidth 20 MHz may be supported using only the bandwidths for a backward compatibility with existing systems. Furthermore, in a carrier aggregation system used in an embodiment of the present invention, new bandwidths may be defined regardless of the bandwidths used in the existing systems in order to support a carrier aggregation.

An LTE-A system uses the concept of a cell in order to manage radio resources.

The aforementioned carrier aggregation environment may also be called a multi-cell environment. A cell is defined as a combination of a pair of a downlink resource (DL CC) and an uplink resource (UL CC), but an uplink resource is not an essential element. Accordingly, a cell may consist of a downlink resource only or a downlink resource and an uplink resource. If specific UE has a single configured serving cell, it may have 1 DL CC and 1 UL CC. If specific UE has two or more configured serving cells, it has DL CCs corresponding to the number of cells, and the number of UL CCs may be the same as or smaller than the number of DL CCs.

In some embodiments, a DL CC and an UL CC may be configured in an opposite way. That is, if specific UE has a plurality of configured serving cells, a carrier aggregation environment in which the number of UL CCs is greater than the number of DL CCs may also be supported. That is, a carrier aggregation may be understood as being an aggregation of two or more cells having different carrier frequency (the center frequency of a cell). In this case, the "cell" should be distinguished from a "cell", that is, a region commonly covered by an eNB.

A cell used in an LTE-A system includes a Primary Cell (PCell) and a Secondary Cell (SCell). A PCell and an SCell may be used as serving cells. In the case of UE which is in an RRC_CONNECTED state, but in which a carrier aggregation has not been configured or which does not support a carrier aggregation, only one serving cell configured as only a PCell is present. In contrast, in the case of UE which is in the RRC_CONNECTED state and in which a carrier aggregation has been configured, one or more serving cells may be present. A PCell and one or more SCells are included in each serving cell.

A serving cell (PCell and SCell) may be configured through an RRC parameter. PhysCellId is the physical layer identifier of a cell and has an integer value from 0 to 503. SCellIndex is a short identifier which is used to identify an SCell and has an integer value of 1 to 7. ServCellIndex is a short identifier which is used to identify a serving cell (PCell or SCell) and has an integer value of 0 to 7. The value 0 is applied to a PCell, and SCellIndex is previously assigned in order to apply it to an SCell. That is, in ServCellIndex, a cell having the smallest cell ID (or cell index) becomes a PCell.

A PCell means a cell operating on a primary frequency (or primary CC). A PCell may be used for UE to perform an initial connection establishment process or a connection re-establishment process and may refer to a cell indicated in a handover process. Furthermore, a PCell means a cell that belongs to serving cells configured in a carrier aggregation environment and that becomes the center of control-related communication. That is, UE may receive a PUCCH allocated only in its PCell and send the PUCCH and may use only the PCell to obtain system information or to change a monitoring procedure. An Evolved Universal Terrestrial Radio Access Network (E-UTRAN) may change only a PCell for a handover procedure using the RRC connection reconfiguration (RRCConnectionReconfiguration) message of a higher layer including mobility control information (mobilityControlInfo) for UE which supports a carrier aggregation environment.

An SCell may mean a cell operating on a secondary frequency (or secondary CC). Only one PCell is allocated to specific UE, and one or more SCells may be allocated to the specific UE. An SCell may be configured after RRC connection is established and may be used to provide additional radio resources. A PUCCH is not present in the remaining cells, that is, SCells that belong to serving cells configured in a carrier aggregation environment and that do not include a PCell. When adding an SCell to UE supporting a carrier aggregation environment, an E-UTRAN may provide all types of system information related to the operation of a related cell in the RRC_CONNECTED state through a dedicated signal. A change of system information may be controlled by releasing and adding a related SCell. In this case, the RRC connection reconfiguration (RRCConnectionReconfigutaion) message of a higher layer may be used. An E-UTRAN may send dedicated signaling having a different parameter for each UE instead of broadcasting within a related SCell.

After an initial security activation process is started, an E-UTRAN may configure a network including one or more SCells by adding to a PCell that is initially configured in a connection establishing process. In a carrier aggregation environment, a PCell and an SCell may operate respective component carriers. In the following embodiments, a Primary Component Carrier (PCC) may be used as the same meaning as a PCell, and a Secondary Component Carrier (SCC) may be used as the same meaning as an SCell.

FIG. 7 shows an example of component carriers and carrier aggregation in a wireless communication system to which an embodiment of the present invention may be applied.

(a) of FIG. 7 illustrates a single carrier structure used in an LTE system. Component carriers include a DL CC and a UL CC. One CC may have a frequency range of 20 MHz.

(b) of FIG. 7 illustrates a carrier aggregation structure used in an LTE_A system. (b) of FIG. 7 illustrates a case in which three CCs having a frequency size of 20 MHz are combined. Three DL CCs and three UL CCs are provided, but there is no limitation in the number of DL CCs and UL CCs. In the case of carrier aggregation, the UE may simultaneously monitor three CCs, receive downlink signal/data, and transmit uplink signal/data.

If N DL CCs are managed in a specific cell, a network may allocate M (M≤N) DL CCs to UE. In this case, the UE may monitor only the M limited DL CCs and receive a DL signal. Furthermore, a network may give priority to L (L≤M≤N) DL CCs and allocate major DL CCs to UE. In this case, the UE must monitor the L DL CCs. Such a method may be applied to uplink transmission in the same manner.

A linkage between a carrier frequency (or DL CC) of a downlink resource and a carrier frequency (or UL CC) of an uplink resource may be indicated by a higher layer message, such as an RRC message, or system information. For example, a combination of DL resources and UL resources may be configured by a linkage defined by System Information Block Type2 (SIB2). Specifically, the linkage may mean a mapping relationship between a DL CC in which a PDCCH carrying an UL grant is transmitted and an UL CC in which the UL grant is used and may mean a mapping relationship between a DL CC (or UL CC) in which data for an HARQ is transmitted and an UL CC (or DL CC) in which an HARQ ACK/NACK signal is transmitted.

Cross-Carrier Scheduling

In a carrier aggregation system, there are two methods, that is, a self-scheduling method and a cross-carrier scheduling method form the point of view of scheduling for a carrier or a serving cell. Cross-carrier scheduling may also be called cross-component carrier scheduling or cross-cell scheduling.

Cross-carrier scheduling means that a PDCCH (DL grant) and a PDSCH are transmitted in different DL CCs or that a PUSCH transmitted according to a PDCCH (UL grant) transmitted in a DL CC is transmitted through an UL CC different from an UL CC that is linked to the DL CC through which the UL grant has been received.

Whether cross-carrier scheduling will be performed may be activated or deactivate in a UE-specific way, and each UE may be notified through high layer signaling (e.g., RRC signaling) semi-statically.

If cross-carrier scheduling is activated, there is a need for a Carrier Indicator Field (CIF) providing notification that a PDSCH/PUSCH indicated by a PDCCH is transmitted through which DL/UL CC. For example, a PDCCH may allocate a PDSCH resource or PUSCH resource to any one of a plurality of component carriers using a CIF. That is, if a PDCCH on a DL CC allocates a PDSCH or PUSCH resource to one of multi-aggregated DL/UL CCs, a CIF is configured. In this case, a DCI format of LTE-A Release-8 may be extended according to the CIF. In this case, the configured CIF may be fixed to a 3-bit field, and the position of the configured CIF may be fixed regardless of the size of the DCI format. Furthermore, a PDCCH structure (resource mapping based on the same coding and the same CCE) of LTE-A Release-8 may be reused.

In contrast, if a PDCCH on a DL CC allocates a PDSCH resource on the same DL CC or allocates a PUSCH resource on a single-linked UL CC, a CIF is not configured. In this case, the same PDCCH structure (resource mapping based on the same coding and the same CCE) and DCI format as those of LTE-A Release-8 may be used.

If cross-carrier scheduling is possible, UE needs to monitor a PDCCH for a plurality of pieces of DCI in the control region of a monitoring CC based on a transmission mode and/or bandwidth corresponding to each CC. Accordingly, there is a need for the configuration of a search space and PDCCH monitoring capable of supporting such monitoring.

In a carrier aggregation system, a UE DL CC set is indicative of a set of DL CCs scheduled so that UE receives a PDSCH. A UE UL CC set is indicative of a set of UL CCs scheduled so that UE transmits a PUSCH. Furthermore, a PDCCH monitoring set is indicative of a set of one or more DL CCs for performing PDCCH monitoring. A PDCCH monitoring set may be the same as a UE DL CC set or may be a subset of a UE DL CC set. A PDCCH monitoring set may include at least one of DL CCs within a UE DL CC set. Alternatively, a PDCCH monitoring set may be separately defined regardless of a UE DL CC set. DL CCs included in a PDCCH monitoring set may be configured so that self-scheduling for a linked UL CC is always possible. Such a UE DL CC set, UE UL CC set, and PDCCH monitoring set may be configured in a UE-specifically, UE group-specifically, or cell-specifically.

If cross-carrier scheduling is deactivated, it means that a PDCCH monitoring set is always the same as UE DL CC set. In this case, there is no indication, such as separate signaling for a PDCCH monitoring set. However, if cross-carrier scheduling is activated, a PDCCH monitoring set may be defined in a UE DL CC set. That is, in order to schedule a PDSCH or PUSCH for UE, an eNB transmits a PDCCH through a PDCCH monitoring set only.

FIG. 8 shows an example of a structure of a subframe according to cross-carrier scheduling in a wireless communication system to which an embodiment of the present invention may be applied.

Referring to FIG. 8, in a DL subframe for an LTE-A UE, three DL CCs are combined and DL CC 'A' indicates a case set with a PDCCH monitoring DL CC. In case where a CIF is not used, each DL CC may transmit a PDCCH scheduling a PDSCH thereof without a CIF. Meanwhile, in case where the CIF is used through higher layer signaling, only one DL CC 'A' may transmit the PDCCH scheduling a PDSCH thereof or a PDSCH of another CC using the CIF. Here, DL CC 'B' and 'C' not set as PDCCH monitoring DL CCs do not transmit the PDCCH.

PDCCH Transmission

The eNB determines a PDCCH format according to a DCI to be transmitted to the UE, and attaches a CRC (Cyclic Redundancy Check) to control information. A unique identifier (which is called an RNTI (Radio Network Temporary Identifier)) is masked to the CRC according to an owner of the PDCCH or a purpose thereof. In the case of a PDCCH for a specific UE, a unique identifier of a UE, e.g., a C-RNTI (Cell-RNTI), may be masked to the CRC. Or, in the case of a PDCCH for a paging message, a paging indication identifier, e.g., a P-RNTI (Paging-RNTI) may be masked to the CRC. In the case of a PDCCH for system information, specifically, a system information block (SIB), a system information identifier or an SI-RNTI (system information RNTI) may be masked to the CRC. In order to indicate a random access response, a response with respect to transmission of a random access preamble of a UE, an RA-RNTI (random access-RNTI) may be masked to the CRC.

Thereafter, the BS performs channel coding on CRC-added control information to generate coded data. Here, the BS may perform channel coding at a code rate according to an MCS level. The BS may perform rate matching according to a CCE aggregation level allocated to a PDCCH format, and modulates the coded data to generate modulated symbols. Here, a modulation order according to the MCS level may be used. A CCE aggregation level of modulated symbols forming one PDCCH may be one of 1, 2, 4 and 8. Thereafter, the BS maps the modulated symbols to physical resource elements (CCE to RE mapping).

A plurality of PDCCHs may be transmitted in one subframe. That is, a control region of one subframe includes a plurality of CCEs having an index 0~N_(CCE,k)−1. Here, N(CCE, k) denotes a total number of CCEs within a control region of a kth subframe. The UE monitors a plurality of PDCCHs in each subframe.

Here, monitoring refers to UE attempting to decode PDCCHs according to a monitored PDCCH format. In a control region allocated within a subframe, the BS does not provide information regarding where a corresponding PDCCH is present. In order to receive a control channel transmitted from the BS, the UE searches for a PDCCH thereof by monitoring an aggregation of PDCCH candidates within a subframe because the UE does not know in which position, at which CCE aggregation level, or in which DCI format, the PDCCH thereof is transmitted. This is called blind decoding/detection (BD). Blind decoding refers to a method by which the UE de-masks a UE ID thereof in a CRC portion and checks a CRC error to determine whether a corresponding PDCCH is a control channel of the UE.

In the active mode, the UE monitors a PDCCH of each subframe to receive data transmitted to the UE. In a DRX mode, the UE wakes up in a monitoring section of each DRX period to monitor a PDCCH in a subframe corresponding to a monitoring section. A subframe in which PDCCH is monitored is called a non-DRX subframe.

In order to receive the PDCCH transmitted to the UE, the UE should perform blind decoding on all CCEs present in the control region of the non-DRX subframe. Since the UE does not know which PDCCH format will be transmitted, the UE should decode all PDCCHs at a possible CCE aggregation level until the blind decoding of the PDCCH is successful in every non-DRX subframe. Since the UE does not know how many CCEs the PDCCH for itself uses, the UE should attempt detection at all possible CCE aggregation levels until the blind decoding of the PDCCH is successful. That is, the UE performs blind decoding by each CCE aggregation level. That is, the UE first attempts at decoding at a CCE aggregation level unit by 1. If decoding fails, the UE attempts at decoding at the CCE aggregate level unit by 2. Thereafter, the UE attempts at decoding the CCE aggregation level unit by 4 and the CCE aggregation level unit by 8 again. Also, the UE attempts at blind decoding on all four C-RNTI, P-RNTI, SI-RNTI and RA-RNTI. In addition, the UE attempts at blind decoding on all DCI formats to be monitored.

In this manner, if the UE attempts at blind decoding by every CCE aggregation level for all DCI formats to be monitored for all possible RNTIs, the number of detection attempts will be excessively increase, and thus, in the LTE system, a search space (SS) concept is defined for blind decoding of the UE. Search space refers to a PDCCH candidate set for monitoring, and may have a different size according to each PDCCH format.

The search space may include a common search space (CSS) and a UE-specific/dedicated search space (USS). In the case of the common search space, all terminals may know a size of the common search space, but the UE-specific search space may be set individually for each terminal. Accordingly, the UE should monitor both the UE-specific search space and the common search space in order to decode the PDCCH, and thus, the UE performs blind decoding (BD) at a maximum of 44 times in one sub-frame. Here, blind decoding performed in accordance with different CRC values (e.g., C-RNTI, P-RNTI, SI-RNTI, RA-RNTI) is not included.

Due to the small search space, it may happen that eNB fails to secure the CCE resources for transmitting the PDCCH to all the UEs to which the PDCCH is to be transmitted within a given subframe. This is because resources remaining after the CCE location are allocated may not be included in the search space of the specific UE. In order to minimize such barriers that may continue in a next sub-frame, a UE-specific hopping sequence may be applied to a starting point of the UE-specific search space.

Table 3 shows a size of the common search space, and a size of the UE-specific search space.

TABLE 3

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

In order to alleviate the computational load of the UE according to the number of attempts at blind decoding, the UE does not simultaneously perform search according to all defined DCI formats. In detail, the UE may always perform search for DCI format 0 and 1A in the UE-specific search space. At this time, DCI formats 0 and 1A have the same size, but the UE may differentiate between the DCI format using a flag (for format 0/format 1A differentiation) used for differentiating between DCI formats 0 and 1A included in the PDCCH. Also, according to the PDSCH transmission mode set by the eNB, a DCI format other than the DCI formats 0 and 1A may be required for the terminal. For example, there are DCI formats 1, 1B, and 2.

In the common search space, the UE may search the DCI formats 1A and 1C. Also, the UE may be configured to search for DCI format 3 or 3A, and DCI formats 3 and 3A have the same size as DCI formats 0 and 1A, but the UE may differentiate the DCI formats using the CRC scrambled by an identifier other than a UE-specific identifier.

A search space $S\_k^{\wedge}(L)$ refers to a PDCCH candidate set according to an aggregation level $L \in \{1,2,4,8\}$. A CCE according to a PDCCH candidate set m of a search space may be determined by Equation 4 below.

$$L \cdot \{(Y_k + m) \bmod \lfloor N_{CCE,k}/L \rfloor\} + i \qquad \text{[Equation 1]}$$

Here, M_(L) denotes the number of PDCCH candidates according to a CCE aggregation level L for monitoring, and m=0~M^(L)−1. i denotes an index designating an individual CCE in each PDCCH candidate, and i=0~L−1.

As described above, the UE monitors both the UE-specific search space and the common search space to decode the PDCCH. Here, the common search space (CSS) supports PDCCHs having an aggregation level $\{4, 8\}$, and the UE-specific search space (USS) supports PDCCHs having an aggregation level $\{1, 2, 4, 8\}$ Table 4 shows PDCCH candidates monitored by the UE.

TABLE 4

| | Search space $S_k^{(L)}$ | | Number of PDCCH |
|---|---|---|---|
| Type | Aggregation level L | Size [in CCEs] | candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to Equation 1, in the case of the CSS, $Y_k$ is set to 0 for two aggregation levels L=4 and L=8. Meanwhile, in the case of the UE-specific SS (USS), $Y_k$ is defined as expressed by Equation 5 for an aggregation level L.

$$Y_k = (A \cdot Y_{k-1}) \bmod D \qquad \text{[Equation 2]}$$

Here, $Y_{-1} = n_{RNTI} \neq 0$, and an RNTI value used for $n_{RNTI}$ may be defined as one of identifiers of the UE. Also, A=39827, D=65537, and $k = \lfloor n_s/2 \rfloor$. Here, n_s denotes a slot number (or index) in a radio frame.

Block Spreading Technique

The block spreading technique is a scheme that modulates transmission of the control signal by using the SC-FDMA scheme unlike the existing PUCCH format 1 series or 2 series. As illustrated in FIG. 11, a symbol sequence may be spread and transmitted on the time domain by using an orthogonal cover code (OCC). The control signals of the plurality of terminals may be multiplexed on the same RB by using the OCC. In the case of PUCCH format 2 described above, one symbol sequence is transmitted throughout the time domain and the control signals of the plurality of terminals are multiplexed by using the cyclic shift (CS) of the CAZAC sequence, while in the case of a block spreading based on PUCCH format (for example, PUCCH format 3), one symbol sequence is transmitted throughout the frequency domain and the control signals of the plurality of terminals are multiplexed by using the time domain spreading using the OCC.

FIG. 9 illustrates one example of generating and transmitting 5 SC-FDMA symbols during one slot in the wireless communication system to which the present invention may be applied.

In FIG. 9, an example of generating and transmitting 5 SC-FDMA symbols (that is, data part) by using an OCC having the length of 5 (alternatively, SF=5) in one symbol sequence during one slot. In this case, two RS symbols may be used during one slot.

In the example of FIG. 9, the RS symbol may be generated from a CAZAC sequence to which a specific cyclic shift value is applied and transmitted in a type in which a predetermined OCC is applied (alternatively, multiplied) throughout a plurality of RS symbols. Further, in the example of FIG. 8, when it is assumed that 12 modulated symbols are used for each OFDM symbol (alternatively, SC-FDMA symbol) and the respective modulated symbols are generated by QPSK, the maximum bit number which may be transmitted in one slot becomes 24 bits (=12×2). Accordingly, the bit number which is transmittable by two slots becomes a total of 48 bits. When a PUCCH channel structure of the block spreading scheme is used, control information having an extended size may be transmitted as compared with the existing PUCCH format 1 series and 2 series.

CA-Based CoMP Operation

In system subsequent to LTE, cooperative multi-point (CoMP) transmission may be implemented using a carrier aggregation (CA) function in LTE.

FIG. 10 is a diagram illustrating a carrier aggregation-based CoMP system in a wireless communication system to which an embodiment of the present invention may be applied.

FIG. 10 illustrates that a primary cell (PCell) carrier and a secondary cell (SCell) carrier use the same frequency band on a frequency axis and are respectively allocated to two eNBs that are geographically spaced apart from each other.

A serving eNB allocates a PCell to UE1, and an neighboring eNB providing much interference allocates an SCell, so that Various DL/UL CoMP operations such as JT, CS/CB, and dynamic cell selection may be performed.

FIG. 10 shows an example in which UE aggregates two eNBs as a PCell and an SCell, respectively. Practically, UE may aggregate three or more cells, and a CoMP operation on some of the three cells in the same frequency band may be performed and a simple CA operation on other cells in a different frequency band may be performed. In this case, the PCell does not need to take part in the CoMP operation.

UE Procedure for Receiving PDSCH

When UE detects a PDCCH of a serving cell on which a DCI format 1, 1A, 1B, 1C, 1D, 2, 2A, 2B or 2C intended for the UE is carried other than a subframe(s) indicated by a higher layer parameter "mbsfn-SubframeConfigList", the UE decodes a corresponding PDSCH in the same subframe with the restriction of the number of transport blocks defined in a higher layer.

UE decodes a PDSCH according to a detected PDCCH with CRC scrambled by an SI-RNTI or P-RNTI on which a DCI format 1A, 1C intended for the UE is carried, and assumes that a PRS is not present in a resource block (RB) on which the corresponding PDSCH is carried.

UE in which a carrier indicator field (CIF) for a serving cell is configured assumes that a CIF is not present in any PDCCH of a serving cell within a common search space.

Otherwise, when PDCCH CRC is scrambled by a C-RNTI or an SPS C-RNTI, UE in which a CIF is configured assumes that a CIF for a serving cell is present in a PDCCH that is located within a UE-specific search space.

When UE is configured by a higher layer so that it decodes a PDCCH with CRC scrambled by an SI-RNTI, the UE decodes the PDCCH and a corresponding PDSCH according to a combination defined in Table 3 below. The PDSCH corresponding to the PDCCH(s) is scrambling-initialized by the SI-RNTI.

Table 5 illustrates a PDCCH and PDSCH configured by an SI-RNTI.

TABLE 5

| DCI FORMAT | SEARCH SPACE | METHOD FOR SENDING PDSCH CORRESPONDING TO PDCCH |
|---|---|---|
| DCI format 1C | common | If the number of PBCH antenna ports is 1, a single antenna port, a port 0 is used, and if not, transmit diversity |
| DCI format 1A | common | If the number of PBCH antenna ports is 1, a single antenna port, a port 0 is used, and if not, transmit diversity |

If UE is configured by a higher layer so that it decodes a PDCCH with CRC scrambled by a P-RNTI, the UE decodes the PDCCH and a corresponding PDSCH according to a combination defined in Table 4 below. The PDSCH corresponding to the PDCCH(s) is scrambling-initialized by the P-RNTI.

Table 6 illustrates a PDCCH and PDSCH configured by a P-RNTI.

TABLE 6

| DCI FORMAT | SEARCH SPACE | METHOD FOR SENDING PDSCH CORRESPONDING TO PDCCH |
|---|---|---|
| DCI format 1C | common | If the number of PBCH antenna ports is 1, a single antenna port, a port 0 is used, and if not, transmit diversity |
| DCI format 1A | common | If the number of PBCH antenna ports is 1, a single antenna port, a port 0 is used, and if not, transmit diversity |

If UE is configured by a higher layer so that it decodes a PDCCH with CRC scrambled by an RA-RNTI, the UE decodes the PDCCH and a corresponding PDSCH according to a combination defined in Table 5 below. The PDSCH corresponding to the PDCCH(s) is scrambling-initialized by the RA-RNTI.

Table 7 illustrates a PDCCH and PDSCH configured by an RA-RNTI.

TABLE 7

| DCI FORMAT | SEARCH SPACE | METHOD FOR SENDING PDSCH CORRESPONDING TO PDCCH |
|---|---|---|
| DCI format 1C | common | If the number of PBCH antenna ports is 1, a single antenna port, a port 0 is used, and if not, transmit diversity |
| DCI format 1A | common | If the number of PBCH antenna ports is 1, a single antenna port, a port 0 is used, and if not, transmit diversity |

UE may be semi-statically configured through higher layer signaling so that it receives PDSCH data transmission signaled through a PDCCH in accordance with any one of 9 transmission modes, including a mode 1 to a mode 9.

In the case of the frame structure type 1,

UE does not receive a PDSCH RB transmitted in the antenna port 5 even in any subframe in which the number of OFDM symbols for a PDCCH having a common CP is 4.

If any one of 2 physical resource blocks (PRBs) to which a virtual resource block (VRB) pair is mapped overlaps a frequency in which a PBCH or a primary or secondary synchronous signal is transmitted within the same subframe, UE does not receive a PDSCH RB transmitted in the antenna port 5, 7, 8, 9, 10, 11, 12, 13 or 14 in the corresponding 2 PRBs.

UE does not receive a PDSCH RB transmitted in the antenna port 7 to which distributed VRB resource allocation has been assigned.

UE may skip the decoding of a transport block if it does not receive all of allocated PDSCH RBs. If the UE skips the decoding, a physical layer indicates that the transport block has not been successfully decoded for a higher layer.

In the case of the frame structure type 2,

UE does not receive a PDSCH RB transmitted in the antenna port 5 even in any subframe in which the number of OFDM symbols for a PDCCH having a common CP is 4.

If any one of 2 PRBs to which a VRB pair is mapped overlaps a frequency in which a PBCH is transmitted within the same subframe, UE does not receive a PDSCH RB transmitted in the antenna port 5 in the corresponding 2 PRBs.

If any one of 2 PRBs to which a VRB pair is mapped overlaps a frequency in which a primary or secondary synchronous signal is transmitted within the same subframe, UE does not receive a PDSCH RB transmitted in the antenna port 7, 8, 9, 10, 11, 12, 13 or 14 in the corresponding 2 PRBs.

If a common CP is configured, UE does not receive a PDSCH in the antenna port 5 in which distributed VRB resource allocation has been assigned within a special subframe in an uplink-downlink configuration #1 or #6.

UE does not receive a PDSCH transmitted in the antenna port 7 to which distributed VRB resource allocation has been assigned.

UE may skip the decoding of a transport block if it does not receive all of allocated PDSCH RBs. If the UE skips the decoding, a physical layer indicates that the transport block has not been successfully decoded for a higher layer.

If UE is configured by a higher layer so that it decodes a PDCCH with CRC scrambled by a C-RNTI, the UE decodes the PDCCH and a corresponding PDSCH according to each combination defined in Table 6 below. The PDSCH corresponding to the PDCCH(s) is scrambling-initialized by the C-RNTI.

If a CIF for a serving cell is configured in UE or UE is configured by a higher layer so that it decodes a PDCCH with CRC scrambled by a C-RNTI, the UE decodes the PDSCH of a serving cell indicated by a CIF value within the decoded PDCCH.

When UE of the transmission mode 3, 4, 8 or 9 receives DCI format 1A assignment, the UE assumes that PDSCH transmission is related to a transport block 1 and a transport block 2 is disabled.

If UE is set as the transmission mode 7, a UE-specific reference signal corresponding to a PDCCH(s) is scrambling-initialized by a C-RNTI.

If an extended CP is used in downlink, UE does not support the transmission mode 8.

If UE is set as the transmission mode 9, when the UE detects a PDCCH with CRC scrambled by a C-RNTI on which the DCI format 1A or 2C intended for the UE is carried, the UE decodes a corresponding PDSCH in a subframe indicated by a higher layer parameter "mbsfn-SubframeConfigList." However, the subframe configured by a higher layer to decode a PMCH or, the subframe configured by a higher layer to be part of a PRS occasion and the PRS occasion is configured only within an MBSFN subframe and the length of a CP used in a subframe #0 is a common CP is excluded.

Table 8 illustrates a PDCCH and PDSCH configured by a C-RNTI.

TABLE 8

| TRANSMISSION MODE | DCI FORMAT | SEARCH SPACE | METHOD FOR SENDING PDSCH CORRESPONDING TO PDCCH |
|---|---|---|---|
| Mode 1 | DCI format 1A | common and UE-specific by a C-RNTI | a single antenna port, a port 0 |
| | DCI format 1 | UE-specific by a C-RNTI | a single antenna port, a port 0 |
| Mode 2 | DCI format 1A | common and UE-specific by a C-RNTI | transmit diversity |
| | DCI format 1 | UE-specific by a C-RNTI | transmit diversity |
| Mode 3 | DCI format 1A | common and UE-specific by a C-RNTI | transmit diversity |
| | DCI format 2A | UE-specific by a C-RNTI | large delay CDD or transmit diversity |
| Mode 4 | DCI format 1A | common and UE-specific by a C-RNTI | transmit diversity |
| | DCI format 2 | UE-specific by a C-RNTI | closed-loop spatial multiplexing or transmit diversity |
| Mode 5 | DCI format 1A | common and UE-specific by a C-RNTI | transmit diversity |
| | DCI format 1D | UE-specific by a C-RNTI | multi-user MIMO |
| Mode 6 | DCI format 1A | common and UE-specific by a C-RNTI | transmit diversity |
| | DCI format 1B | UE-specific by a C-RNTI | closed-loop spatial multiplexing using a single transport layer |
| Mode 7 | DCI format 1A | common and UE-specific by a C-RNTI | If the number of PBCH antenna ports is 1, a single antenna port, a port 0 is used, and if not, |

TABLE 8-continued

| TRANS-MISSION MODE | DCI FORMAT | SEARCH SPACE | METHOD FOR SENDING PDSCH CORRESPONDING TO PDCCH |
|---|---|---|---|
| | DCI format 1 | UE-specific by a C-RNTI | transmit diversity Single antenna port, a port 5 |
| Mode 8 | DCI format 1A | common and UE-specific by a C-RNTI | If the number of PBCH antenna ports is 1, a single antenna port, a port 0 is used, and if not, transmit diversity |
| | DCI format 2B | UE-specific by a C-RNTI | dual layer transmission, ports 7 and 8 or a single antenna port, a port 7 or 8 |
| Mode 9 | DCI format 1A | common and UE-specific by a C-RNTI | Non-MBSFN subframe: if the number of PBCH antenna ports is 1, a single antenna port, a port 0 is used, and if not, transmit diversity MBSFN subframe: a single antenna port, a port 7 |
| | DCI format 2C | UE-specific by a C-RNTI | layer transmission up to a maximum of 8, ports 7-14 |

If UE is configured by a higher layer so that it decodes a PDCCH with CRC scrambled by an SPS C-RNTI, the UE decodes a PDCCH of a primary cell and a corresponding PDSCH of the primary cell according to each combination defined in Table 7 below. If a PDSCH is transmitted without a corresponding PDCCH, the same PDSCH-related configuration is applied. The PDSCH corresponding to the PDCCH and the PDSCH not having a PDCCH is scrambling-initialized by the SPS C-RNTI.

If UE is set as the transmission mode 7, a PDCCH(s) and a corresponding UE-specific reference signal is scrambling-initialized by an SPS C-RNTI.

If UE is set as the transmission mode 9, when the UE detects a PDCCH with CRC scrambled by an SPS C-RNTI on which the DCI format 1A or 2C intended for the UE is carried or a PDSCH configured without a PDCCH intended for the UE, the UE decodes a corresponding PDSCH in a subframe indicated by a higher layer parameter "mbsfn-SubframeConfigList." However, the subframe configured a higher layer to decode a PMCH or, the subframe configured by a higher layer to be part of a PRS occasion and the PRS occasion is configured only within an MBSFN subframe and the CP length used in a subframe #0 is a common CP is excluded.

Table 9 illustrates a PDCCH and PDSCH configured by an SPS C-RNTI.

TABLE 9

| TRANS-MISSION MODE | DCI FORMAT | SEARCH SPACE | METHOD FOR SENDING PDSCH CORRESPONDING TO PDCCH |
|---|---|---|---|
| Mode 1 | DCI format 1A | common and UE-specific by a C-RNTI | a single antenna port, a port 0 |
| | DCI format 1 | UE-specific by a C-RNTI | a single antenna port, a port 0 |
| Mode 2 | DCI format 1A | common and UE-specific by a C-RNTI | transmit diversity |
| | DCI format 1 | UE-specific by a C-RNTI | transmit diversity |

TABLE 9-continued

| TRANS-MISSION MODE | DCI FORMAT | SEARCH SPACE | METHOD FOR SENDING PDSCH CORRESPONDING TO PDCCH |
|---|---|---|---|
| Mode 3 | DCI format 1A | common and UE-specific by a C-RNTI | transmit diversity |
| | DCI format 2A | UE-specific by a C-RNTI | transmit diversity |
| Mode 4 | DCI format 1A | common and UE-specific by a C-RNTI | transmit diversity |
| | DCI format 2 | UE-specific by a C-RNTI | transmit diversity |
| Mode 5 | DCI format 1A | common and UE-specific by a C-RNTI | transmit diversity |
| Mode 6 | DCI format 1A | common and UE-specific by a C-RNTI | transmit diversity |
| Mode 7 | DCI format 1A | common and UE-specific by a C-RNTI | a single antenna port, a port 5 |
| | DCI format 1 | UE-specific by a C-RNTI | a single antenna port, a port 5 |
| Mode 8 | DCI format 1A | common and UE-specific by a C-RNTI | a single antenna port, a port 7 |
| | DCI format 2B | UE-specific by a C-RNTI | a single antenna port, a port 7 or 8 |
| Mode 9 | DCI format 1A | common and UE-specific by a C-RNTI | a single antenna port, a port 7 |
| | DCI format 2C | UE-specific by a C-RNTI | a single antenna port, a port 7 or 8 |

If UE is configured by a higher layer so that it decodes a PDCCH with CRC scrambled by a temporary C-RNTI and is configured to not decode a PDCCH with CRC scrambled by a C-RNTI, the UE decodes a PDCCH and a corresponding PDSCH according to a combination defined in Table 9. The PDSCH corresponding to the PDCCH(s) is scrambling-initialized by the temporary C-RNTI.

Table 10 illustrates a PDCCH and a PDSCH configured by a temporary C-RNTI.

TABLE 10

| DCI FORMAT | SEARCH SPACE | METHOD FOR SENDING PDSCH CORRESPONDING TO PDCCH |
|---|---|---|
| DCI format 1A | common and UE-specific by a temporary C-RNTI | If the number of PBCH antenna ports is 1, a single antenna port, a port 0 is used, and if not, transmit diversity |
| DCI format 1 | UE-specific by a temporary C-RNTI | If the number of PBCH antenna ports is 1, a single antenna port, a port 0 is used, and if not, transmit diversity |

Quasi Co-Located (QCL) Between Antenna Ports

Quasi co-located and quasi co-location (QC/QCL) may be defined as follows.

If two antenna ports have a QC/QCL relation (or subjected to QC/QCL), UE may assume that the large-scale property of a signal transferred through one antenna port may be inferred from a signal transferred through the other antenna port. In this case, the large-scale property includes one or more of Delay spread, Doppler spread, Frequency shift, Average received power, and Received timing.

Furthermore, the following may be defined. Assuming that two antenna ports have a QC/QCL relation (or subjected to QC/QCL), UE may assume that the large-scale property of a channel of which one symbol is transferred through one antenna port may be inferred from a wireless channel of which one symbol is transferred through the other antenna port. In this case, the large-scale property includes one or more of Delay spread, Doppler spread, Doppler shift, Average gain, and Average delay.

That is, if two antenna ports have a QC/QCL relation (or subjected to QC/QCL), it means that the large-scale property of a wireless channel from one antenna port is the same as the large-scale property of a wireless channel from the other antenna port. Assuming that a plurality of antenna ports in which an RS is transmitted is taken into consideration, if antenna ports on which two types of different RSs are transmitted have a QCL relation, the large-scale property of a wireless channel from one antenna port may be replaced with the large-scale property of a wireless channel from the other antenna port.

In this specification, the QC/QCL-related definitions are not distinguished. That is, the QC/QCL concept may comply with one of the definitions. In a similar other form, the QC/QCL concept definition may be changed in a form in which antenna ports having an established QC/QCL assumption may be assumed to be transmitted at the same location (i.e., co-location) (e.g., UE may assume antenna ports to be antenna ports transmitted at the same transmission point). The spirit of the present invention includes such similar modifications. In an embodiment of the present invention, the QC/QCL-related definitions are interchangeably used, for convenience of description.

In accordance with the concept of the QC/QCL, UE may not assume the same large-scale property between wireless channels from corresponding antenna ports with respect to non-QC/QCL antenna ports. That is, in this case, UE may perform independent processing on timing acquisition and tracking, frequency offset estimation and compensation, delay estimation, and Doppler estimation for each configured non-QC/QCL antenna port.

There are advantages in that UE may perform the following operations between antenna ports capable of an assuming QC/QCL:

With respect to the Delay spread and Doppler spread, UE may identically apply the results of a power-delay profile, Delay spread and Doppler spectrum, and Doppler spread estimation for a wireless channel from any one antenna port to a Wiener filter which is used upon channel estimation for a wireless channel from other antenna ports.

With respect to the Frequency shift and received timing, UE may perform time and frequency synchronization on any one antenna port and then apply the same synchronization to the demodulation of other antenna ports.

With respect to the Average received power, UE may average reference signal received power (RSRP) measurement for two or more antenna ports.

For example, if a DMRS antenna port for downlink data channel demodulation has been subjected to QC/QCL with the CRS antenna port of a serving cell, UE may apply the large-scale property of a wireless channel estimated from its own CRS antenna port upon channel estimation through the corresponding DMRS antenna port, in the same manner, thereby improving reception performance of a DMRS-based downlink data channel.

The reason for this is that an estimation value regarding a large-scale property may be more stably obtained from a CRS because the CRS is a reference signal that is broadcasted with relatively high density every subframe and in a full bandwidth. In contrast, a DMRS is transmitted in a UE-specific manner with respect to a specific scheduled RB, and the precoding matrix of a precoding resource block group (PRG) unit that is used by an eNB for transmission may be changed. Thus, a valid channel received by UE may be changed in a PRG unit. Accordingly, although a plurality of PRGs has been scheduled in the UE, performance deterioration may occur when the DMRS is used to estimate the large-scale property of a wireless channel over a wide band. Furthermore, a CSI-RS may also have a transmission cycle of several~several tens of ms, and each resource block has also low density of 1 resource element for each antenna port in average. Accordingly, the CSI-RS may experience performance deterioration if it is used to estimate the large-scale property of a wireless channel.

That is, UE may perform the detection/reception, channel estimation, and channel state report of a downlink reference signal through a QC/QCL assumption between antenna ports.

D2D (Device-to-Device) Communication

FIG. 11 shows elements regarding a scheme of direct communication between terminals (D2D).

In FIG. 11, the UE refers to a terminal of a user, and in case where network equipment such as an eNB transmits and receives a signal according to a communication scheme with a UE, the corresponding network equipment may also be regarded as a UE. Hereinafter, UE1 may select a resource unit corresponding to a specific resource within a resource pool indicating a set of resources and operates to transmit a D2D signal using the corresponding resource unit. A UE2, which is a receiving UE thereof, configures a resource pool in which a UE1 may transmit a signal and detects a signal of the UE1 in the corresponding pool. Here, the resource pool may be notified by a BS when the UE1 is within a connection range of the BS, and may be informed by another UE or determined as a predetermined resource when it is outside the connection range of the BS. In general, a resource pool may include a plurality of resource units, and each UE may select one or a plurality of resource units to use the same to transmit a D2D signal thereof.

FIG. 12 shows an embodiment of configuration of resource units.

Referring to FIG. 12, a total of N_F*N_T resource units may be defined by dividing the entire frequency resources into N_F and the entire time resources into N_T. Here, it may be expressed that the corresponding resource pool is repeated at intervals of N_T subframes. Characteristically, one resource unit may appear repeatedly periodically as shown in the drawing. Or, an index of a physical resource unit to which one logical resource unit is mapped may change in a predetermined pattern over time in order to obtain a diversity effect in the time or frequency domain. In this resource unit structure, the resource pool may refer to a set of resource units which may be used by the UE to transmit the D2D signal.

The resource pools described above may be subdivided into various kinds. First, the resource pools may be divided according to the content of a D2D signal transmitted in each resource pool. For example, the content of the D2D signal may be divided as follows, and a separate resource pool may be configured for each signal.

Scheduling assignment (SA): A signal including a position of a resource used for transmission of a D2D data channel performed by each transmitting UE, and information such as a modulation and coding scheme (MCS) required for demodulating other data channels, a MIMO transmission scheme and/or timing advance, and the like.

This signal may also be multiplexed and transmitted along with the D2D data on the same resource unit. In this disclosure, the SA resource pool may refer to a pool of resources in which the SA is multiplexed and transmitted with the D2D data, and may also be referred to as a D2D control channel.

D2D data channel: A resource pool used by a transmitting UE to transmit user data using a resource designated through an SA. When it is possible to be multiplexed and transmitted together with the D2D data on the same resource unit, only a D2D data channel without the SA information may be transmitted in the resource pool for the D2D data channel. In other words, the resource element, which was used to transmit the SA information on the individual resource unit in the SA resource pool, may be used to transmit D2D data in the D2D data channel resource pool.

Discovery channel: A resource pool for a message to which a transmitting UE transmits information such as its own ID, or the like, so that a neighboring UE may discover the transmitting UE.

Contrary to the above case, even when the content of the D2D signal is the same, different resource pools may be used depending on the transmission/reception properties of the D2D signal. For example, even the same D2D data channel or a discovery message may be classified into different resource pools depending on a transmission timing determination scheme of the D2D signal (for example, whether it is transmitted at a time point when a synchronization reference signal is received or whether it is transmitted by applying a certain timing advance at the corresponding time point), a resource allocation scheme (e.g., whether the eNB designates transmission resource of an individual signal to an individual transmitting UE or whether an individual transmitting UE selects an individual signaling transmission resource by itself from the pool), a signal format (e.g., the number of symbols of each D2D signal which occupy one subframe, or the number of subframes used for transmission of one D2D signal), signal strength from the eNB, strength of transmission power of the D2D UE, and the like.

In this disclosure, for the purposes of description, a method in which the eNB directly indicates a transmission resource of a D2D transmitting UE in D2D communication will be called/defined as Mode 1 and a method in which a transmission resource region is set in advance, the eNB designates a transmission resource region, and a UE directly selects a transmission resource will be called/defined as Mode 2. In the case of D2D discovery, a case in which the eNB directly indicates resource will be called/defined as Type 2 and a case in which the UE directly selects transmission resource in a preset resource region or a resource region indicated by the eNB will be called/defined as Type 1.

The afore-mentioned D2D may also be called a sidelink, the SA may be called a physical sidelink control channel (PSCCH), a D2D synchronization signal may be called a sidelink synchronization signal (SSS), a control channel for transmitting most basic information prior to D2D communication transmitted together with the SSS may be called a physical sidelink broadcast channel (PSBCH), or a PD2DSCH (Physical D2D synchronization channel) by a different name. A signal indicating that a specific terminal is in its vicinity, which may include an ID of a specific terminal, may be called a physical sidelink discovery channel (PSDCH).

In D2D of Rel. 12, only a D2D communication UE transmits the PSBCH together with the SSS, and therefore, measurement of the SSS is performed using a DMRS of the PSBCH. An out-coverage UE measures the DMRS of the PSBCH and measures a reference signal received power (RSRP) of the signal to determine whether the UE will become a synchronization source.

V2X (Vehicle-to-Vehicle/Infrastructure/Pedestrian) Communication

In the present invention, V2X communication-related technologies providing the following service types will be described. Three typical service types of V2X communication are as follows.

V2V (vehicle-to-vehicle): Communication between vehicles

V2I (vehicle-to-infrastructure): Communication between a vehicle and a roadside unit (RSU) which is implemented in an eNB or a stationary UE V2P (vehicle-to-pedestrian): Communication between a vehicle and a device carried by an individual (pedestrian, cyclist, driver or passenger)

FIGS. 13 and 14 show V2X communication according to an embodiment of the present invention. More specifically, FIG. 13 shows V2V and V2I communication according to an embodiment of the present invention, and FIG. 14 shows V2P communication according to an embodiment of the present invention.

A vehicle may perform V2X communication to transmit various information/messages. In particular, V2X communication may be performed for the purpose of informing about a specific situation such as an accident.

For example, referring to FIG. 13, when a vehicle accident occurs at a specific point, the accident vehicle may transmit a warning message to a neighboring vehicle to inform the occurrence of the accident. In this case, the accident vehicle may directly transmit a warning message (e.g., V2X message, cooperative awareness message (CAM)/decentralized environmental notification message (DENM)) to a nearby vehicle, which may correspond to V2V communication. Alternatively, the accident vehicle may transmit a warning message to a nearby vehicle through an infrastructure network such as an LTE RSU, or the like, located therearound, which may correspond to V2I communication.

Or, referring to FIG. 14, if it is predicted that a pedestrian and a vehicle will approach each other at a rapid pace and collide with each other, the corresponding vehicle may directly transmit a collision warning message to a terminal of the pedestrian, which may correspond to V2P communication. At this time, a receiver for receiving the message in the V2P communication is not limited to the terminal of the pedestrian and may correspond to all terminals available for V2P communication such as a terminal of a bicycle/vehicle driver or an occupant of a bicycle/vehicle.

In this manner, the V2X communication may be performed for a specific purpose such as to inform an emergency situation more rapidly, and a method for operating V2X communication more effectively has been actively discussed.

This specification proposes various technologies for V2I communication support by more focusing on a V2I environment. However, a corresponding technology is not limited to only the V2I environment and may be applied to other communication environments identically/similarly.

Hereinafter, a case where an accident was generated in a vehicle that is being driven as in FIG. 21, for convenience of description, and the accident vehicle (or a vehicle related to the accident) at the point where the accident occurred notifies surrounding cells of the accident situation is assumed.

In this case, a specific cell (e.g., an infrastructure network such as an RSU) that has received the accident situation may provide a "proximity safety service" that broadcasts/multicasts the accident situation so that a UE (e.g., the UE of another vehicle or pedestrian) within its coverage can check the accident situation. In addition to such a proximity safety service, a broadcast/multicast transmission scenario in which each cell in a V2X communication environment provides various service, such as various commercial applications, may be defined.

In this specification, in order to specifically define/describe such a broadcast/multicast transmission scenario, in a V2X communication environment, broadcast/multicast transmission from a specific node (e.g., a cell or an RSU) is collectively called as "V2X broadcast/multicast transmission", and a V2X broadcast/multicast-transmitted message/information/data/signal is collectively called as a "V2X broadcast/multicast message." Furthermore, in a common cellular communication environment, unicast data transmission from a serving cell is collectively called a "(unicast) PDSCH transmission."

Transmission resources for V2X broadcast/multicast transmission may be semi-statically coordinated and operated between neighboring cells (or within a cluster of a specific volume).

For example, a resource pool in which a V2X broadcast/multicast message can be transmitted may have been configured/agreed (within a cluster) at a point of time at which a Cell A has applied an A(ms) SF offset in a cycle of T(ms), at a point of time at which a Cell B has applied the same cycle B(ms) SF offset, and a Cell C has applied the same cycle C(ms) SF offset.

Alternatively, the resource pools may have been configured/agreed (within a cluster) so that V2X broadcast/multicast messages are transmitted at the same point of time (i.e., through the same subframe) for each of Cells A, B and C, but are transmitted through different frequency resources (i.e., in an FDM form).

In the latter example, in order for a UE to receive all the V2X broadcast/multicast messages transmitted (i.e., transmitted through the same subframe) by the plurality of cells, the corresponding UE must correspond to a UE capable of "simultaneous data reception from a plurality of cells (or neighboring cells)." In other words, in the latter example, a UE for simultaneously receiving the V2X broadcast/multicast messages from the Cells A-C may be limited to a UE having a UE reception capability (or reported to a network) indicative of "simultaneous data reception from a plurality of cells (or neighboring cells)."

Accordingly, there may be a UE that does not receive a V2X broadcast/multicast message depending on the reception capability of each UE. However, in the case of the proximity safety service in which an accident situation (or a collision warning) must be broadcasted/multicast, all of UEs must be able to receive a V2X broadcast/multicast message regardless of the reception capability of each UE.

Accordingly, this specification proposes an efficient mechanism for dividing the reception capability of each UE into some hierarchies (or type/level, etc.) (or layered), defining a method/scenario for receiving a V2X broadcast/multicast message for each hierarchy, and enabling "all of" UEs within coverage to receive a V2X broadcast/multicast message regardless of their UE reception capability.

To this end, a UE notifies a network (or an eNB/serving cell) of its reception capability. When the network schedules a unicast PDSCH for the UE, it may schedule the unicast PDSCH by taking into consideration the reception capability of the UE. More specifically, when the network schedules the unicast PDSCH by taking into consideration the received reception capability of the UE, it may determine whether to schedule (i.e., perform TDM) the unicast PDSCH at a point of time identical with or different from that of the V2X broadcast/multicast message of a neighboring cell. For example, it may be assumed that a first UE UE1 may receive a V2X broadcast/multicast message from a Cell A and is simultaneously capable of the simultaneous reception of a unicast PDSCH from a Cell B, whereas a second UE UE2 is incapable of message simultaneous reception from the Cells A and B. In this case, when a network performs unicast PDSCH transmission scheduling, the network may schedule a unicast PDSCH based on the UE reception capability information of each UE so that the unicast PDSCH is transmitted (i.e., in a TDM method/form) to the first UE UE1 at the same point of time as a V2X broadcast/multicast message and so that the unicast PDSCH is transmitted (i.e., in a TDM method/form) to the second UE UE2 at a point of time different from that of the V2X broadcast/multicast message. In this specification, "transmission/reception at the same point of time" or "simultaneous transmission/reception" may mean transmission/reception through a single subframe.

If scheduling is performed by taking into consideration the UE reception capability as described above, a network may transmit a V2X broadcast/multicast message to all of UEs within coverage regardless of/irrespectively of the reception capability of a UE. Accordingly, there is an effect in that overall system performance can be improved because limited network resources are more efficiently allocated/used.

Hereinafter, there is proposed a detailed method/embodiment for dividing the UE reception capability into a plurality of types based on a fast Fourier transform (FFT) type/kind, channel estimation and a data decoding chain type/kind and receiving a V2X broadcast/multicast message for each type of each UE. However, the present invention is not limited to the following embodiment and the UE reception capability type may be layered/classified depending on various parameters.

Each UE may transmit UE reception capability information indicative of its own UE reception capability type to a network by signaling the UE reception capability information.

1. UE Reception Capability Type 1 (First Embodiment)—Single FFT, Single Channel Estimation and Single Data Decoding Chain The UE reception capability type 1 (hereinafter "type 1") may be defined as a UE type that applies single FFT, single channel estimation and a single data decoding chain. A type 1 UE may correspond to the cheapest UE implementation form.

A UE of type 1 may use a single FFT module and a single channel estimation and data restoration module for channel estimation, signal reception and in order to decode a received signal. Accordingly, the type 1 UE is incapable of simultaneous reception of a unicast PDSCH transmitted by another cell (e.g., a serving cell) at a point of time at which a V2X broadcast/multicast message is received (from a specific cell).

Accordingly, a network (or an eNB/serving cell) that has received the UE reception capability of a UE indicative of type 1 may not schedule unicast PDSCH transmission at a point of time at which a V2X broadcast/multicast message is transmitted. That is, the network may schedule the V2X broadcast/multicast message and the unicast PDSCH so that they are transmitted according to a TDM method. In this case, the unicast PDSCH may be transmitted through a subframe different from a subframe in which the V2X broadcast/multicast message is transmitted.

As described above, in order to receive the V2X broadcast/multicast message transmitted according to the TDM method, a specific gap in which a control channel (e.g., PDCCH) transmitted by the serving cell is not decoded may be configured in the type 1 UE. In this specification, such a specific gap may be called a non-serving-cell data reception (NDR) gap, but the present invention is not limited thereto. The corresponding specific gap may be called various names.

The NDR gap is a concept different from a conventional measurement gap and thus may be configured independently of the corresponding measurement gap.

More specifically, the conventional measurement gap may be configured so that a UE measures inter-frequency RRM. During the measurement gap, the UE does not receive a signal from a serving cell and may obtain an RRM measured value by measuring the reference signal (RS) of another frequency band. The UE may apply/use the obtained RRM measured value for an operation related to an RRM report.

In contrast, the NDR gap may be configured so that a UE receives a V2X broadcast/multicast message from another cell (e.g., a non-serving cell) other than a serving cell. Accordingly, during the configured NDR gap, the UE does not receive a signal (e.g., a control channel or an RS) from its own serving cell, but may receive a signal from a non-serving cell. In this case, the non-serving cell may indicate a cell that does not serve the UE. To this end, the UE may switch an FFT/channel estimation (CE)/decoding chain, configured for use of signal reception from the serving cell, into use for signal reception from the non-serving cell. For example, if the non-serving cell is out of synchronization with the serving cell, the UE may move the FFT window of an FFT chain so that it is suitable for signal reception from the non-serving cell.

That is, the UE may stop signal reception from the serving cell during the NDR gap and change the configuration of an FFT/CE/decoding chain based on a specific non-serving cell so that it can receive a signal from a specific non-serving cell and decode data. In particular, during the configured NDR gap, the UE may receive a V2X broadcast/multicast message from the non-serving cell. Such an NDR gap may be configured for only a purpose for providing a V2X service type.

A method in which an NDR gap is configured may include various embodiments as follows.

In one embodiment, the NDR gap may be expressed in a bitmap form of a subframe (SF) and provided/indicated to a UE through high layer signaling. In another embodiment, a parameter value(s), such as the period/duration/SF offset of a specific SF interval corresponding to an NDR gap may be provided/indicated to a UE. In this case, information about a system frame number (SFN) along with a corresponding parameter value(s) may be provided to the UE. If the information is provided to the UE due to the addition of an SFN, the NDR gap may be configured in a form in which the NDR gap is periodically present in each frame having an SFN, that is, a multiple of a specific value.

In addition, assistance information regarding that which data type (e.g., a V2X broadcast/multicast message type) has to be received from which cell during the NDR gap may be additionally transmitted/indicated for each UE.

For example, a cell-ID list including identification information of a target cell that needs to receive a signal/data, an RNTI (e.g., broadcast/multicast RNTI) used for the control channel decoding of the target cell, etc. may be transmitted/indicated for each UE as assistance information. A UE that has received an RNTI may receive/decode a control channel masked with the indicated RNTI.

A cell-ID list included in assistance information and provided to a UE is independently configured separately from a cell-ID list provided for RRM measurement and thus different from the cell-ID list provided for RRM measurement. The reason for this is that as described above, the cell-ID list provided for an NDR gap indicates identification information of a target cell that transmits a V2X broadcast/multicast message and a cell-ID list provided for an RRM measurement gap indicates identification information of a target cell, that is, an object of RRM measurement.

If V2X broadcast/multicast transmission is dynamically scheduled, V2X broadcast/multicast transmission scheduling information may be indicated/provided to a UE through DCI masked with an indicated RNTI through a control channel (e.g., PDCCH) for each cell. Accordingly, a UE may obtain V2X broadcast/multicast transmission scheduling information through the DCI masked with the indicated RNTI, and may receive a V2X broadcast/multicast message transmitted within an NDR gap based on obtained scheduling information.

Alternatively, V2X broadcast/multicast transmission may be scheduled semi-statically (or semi-persistently). In this case, a UE may be previously provided with V2X broadcast/multicast transmission scheduling information (or semi-persistently scheduling information) from a serving cell and may not need to separately receive or detect DCI.

More specifically, a cell may previously determine/configure its own V2X broadcast/multicast transmission time through a negotiation with another cell. For example, cells may determine/configure a V2X broadcast/multicast transmission time by exchanging (or transmitting/receiving) at least one of transmission time interval information transfer/request/reject/confirm messages requested by the cells with another cell in the form of X2/backhaul signaling. Furthermore, a cell may transmit V2X broadcast/multicast transmission scheduling information (or semi-persistent scheduling information), including determined/configured V2X broadcast/multicast transmission time information, to a serving cell. The serving cell may transfer corresponding scheduling information to UEs connected thereto. The present embodiment has an advantage in that a UE does not need to receive/decode DCI in order to receive a V2X broadcast/multicast message because V2X broadcast/multicast scheduling information is previously provided by a serving cell.

When the present embodiment is applied, if there is a V2X urgent message to be transmitted in a V2X broadcast/multicast transmission time, the payload size of the V2X broadcast/multicast message transmitted in the corresponding transmission time may be set large. In contrast, if there is no V2X urgent message to be transmitted in a V2X broadcast/multicast transmission time or there is no special event, there is no V2X broadcast/multicast message transmitted in the corresponding transmission time or a V2X broadcast/multicast message having a payload size of a small size having a form including only essential some information may be transmitted.

A V2X broadcast/multicast message may be configured/designed in such a manner that ACK/NACK transmission from a UE is not requested. That is, although the UE succeeds or fails in V2X broadcast/multicast message reception, it may not transmit separate ACK/NACK for notifying a network of the success or failure. Accordingly, if an NDR gap has been configured, a UE may perform only an operation of receiving a V2X broadcast/multicast message from a target cell during a configured NDR gap.

2. UE Reception Capability Type 2 (Second Embodiment)—Single FFT, Double (or Multiple) Channel Estimation and a Double (or Multiple) Data Decoding Chain A UE reception capability type 2 (hereinafter "type 2") may be defined as a UE type that applies single FFT, double (or multiple) channel estimation and a double (or multiple) data decoding chain.

A type 2 UE is capable of double (or multiple) RS detection through the execution of single FFT. Accordingly, if unicast PDSCH transmission is scheduled, a network (or an eNB/serving cell) that has received the UE reception capability of a UE indicative of type 2 needs to schedule unicast PDSCH transmission at the same point of time as the point at which a V2X broadcast/multicast message is transmitted by cells that are out of synchronization at a preset level or more. Accordingly, the UE may receive the V2X broadcast/multicast message from cell that are out of synchronization with the serving cell at a preset level or more along with the unicast PDSCH of a serving cell.

If a non-serving cell that transmits a V2X broadcast/multicast message to a type 2 UE and a serving cell that transmits unicast PDSCH to the type 2 UE are out of synchronization at a preset level or more, the UE may operate according to the first embodiment.

That is, although a network receives the UE reception capability of the UE indicative of type 2, if the serving cell and the non-serving cell are out of synchronization at a preset level or more, as described in the first embodiment, the network may schedule a V2X broadcast/multicast message and a unicast PDSCH according to a TDM method and may configure an NDR gap for V2X broadcast/multicast message reception for the UE.

3. UE Reception Capability Type 3 (Third Embodiment)—Double (or Multiple) FFT, Double (or Multiple) Channel Estimation and a Double (or Multiple) Data Decoding Chain A UE reception capability type 3 (hereinafter "type 3") may be defined as a UE type that applies double (or multiple) FFT, double (or multiple) channel estimation and a double (or multiple) data decoding chain.

A type 3 UE is capable of double (or multiple) RS detection through the execution of double (or multiple) FFT. Accordingly, if unicast PDSCH transmission is scheduled, a network (or an eNB/serving cell) that has received the UE reception capability of a UE indicative of type 3 may schedule unicast PDSCH transmission at the same point of time as a point of time at which V2X broadcast/multicast messages transmitted by cells out of synchronization in addition to cells in synchronization are transmitted. Accordingly, the UE may receive the V2X broadcast/multicast message from other cells along with the unicast PDSCH of the serving cell regardless of whether it is in synchronization with the serving cell. Accordingly, resource use efficiency and a yield increase effect can be obtained.

The reception capability of a type 3 UE may be subdivided as follows depending on whether a CA, dual connectivity (DC) and/or a D2D communication link has been configured or not (or the capability may be modified). In this case, additional information such as modified type or subdivided UE capability information may be signaled by a UE and transmitted to a network.

For example, a UE that applies M FFT chains, N channel estimation and data decoding chains are applied, but first uses the M and/or N chains for a CA, DC and/or D2D (or other specific operations/objects) may be subdivided and defined as a "UE reception capability type 3a."

Such a type 3a UE may use the remaining chains of the M and/or N chains other than chains first used for operations, such as a CA, DC and/or D2D, for V2X broadcast/multicast transmission and the simultaneous reception of a unicast PDSCH.

Accordingly, a network (or an eNB) that has received the UE reception capability of a UE indicative of type 3a may check whether the remaining chains of the M and/or N chains are present other than chains first used for operations, such as CA, DC and/or D2D. If it is found that the remaining chains are present, the network is aware that the UE is capable of the simultaneous reception of a V2X broadcast/multicast message and a unicast PDSCH, and may schedule points of time at which the two messages are transmitted as the same point of time. If the network has checked that there is no remaining chain, the network may schedule the V2X broadcast/multicast message and the unicast PDSCH according to the TDM method using the first embodiment, and may configure an NDR gap for V2X broadcast/multicast message reception for the UE.

That is, in other words, the network may configure a point of time at which the unicast PDSCH is transmitted to be identical with or different from a point of time at which the V2X broadcast/multicast message is transmitted based on whether the remaining chain is present or not.

A method for receiving a V2X broadcast/multicast message (or a method of scheduling unicast PDSCH transmission) for each reception capability of each UE type has been described above.

In this specification, a method of simultaneously transmitting/receiving a V2X broadcast/multicast message and a unicast PDSCH has been chiefly described, for convenience of description, but the present invention is not limited thereto. The present invention may be extended to a technology in which a single UE simultaneously receives a plurality of data channels.

That is, UE reception capability information may be basically layered/divided into the three types as described above depending on whether a UE can simultaneously receive a second data channel (e.g., a unicast PDSCH) along with a first data channel (e.g., a V2X broadcast/multicast message), and the UE may transmit type information corresponding to its own capability to a network by signaling the type information. If a UE is incapable of the simultaneous reception of the first and second data channels, it may correspond to type 1, and the contents described in relation to the first embodiment may be applied, such as that a network configures an NDR gap so that the UE can receive both the first and second data channels.

FIG. 15 is a flowchart for illustrating a broadcast/multicast message reception method of a UE according to an embodiment of the present invention. The aforementioned embodiments may be identically applied to this flowchart. Accordingly, redundant description is hereinafter omitted. Furthermore, this flowchart may be applied in a wireless communication system supporting V2X communication.

First, a UE may transmit its own reception capability information to a serving cell (S1510). The reception capability of the UE may be divided into a plurality of types based on a fast Fourier transform (FFT) type/kind, channel estimation and a data decoding chain type/kind as described above.

For example, a UE reception capability type 1 (hereinafter "type 1") may be defined as a UE type that applies single FFT, single channel estimation and a single data decoding chain. Furthermore, a UE reception capability type 2 (hereinafter "type 2") may be defined as a UE type that applies single FFT, double (or multiple) channel estimation and a double (or multiple) data decoding chain. A UE reception capability type 3 (hereinafter "type 3") may be defined as a UE type that applies double (or multiple) FFT, double (or multiple) channel estimation and a double (or multiple) data decoding chain.

Next, the UE may receive a PDSCH from the serving cell (S1520). Furthermore, the UE may receive a broadcast/multicast message from the non-serving cell (S1530). In this case, the PDSCH and the broadcast/multicast message may be transmitted through the same subframe or may be transmitted through different subframes. As described above, whether the PDSCH and the broadcast/multicast message will be transmitted through the same subframe may be determined based on the reception capability of the UE.

For example, in the case of the type 1 UE, the PDSCH and the broadcast/multicast message may be transmitted through different subframes. Furthermore, in the case of the type 2 UE, the PDSCH and the broadcast/multicast message may be transmitted through the same subframe. In this case, the broadcast/multicast message may correspond to a message transmitted by a non-serving cell out of synchronization with the serving cell of the type 2 UE at a preset level or more. Furthermore, in the case of the type 3 UE, the PDSCH and the broadcast/multicast message may be transmitted through the same subframe. In this case, the broadcast/multicast message may correspond to a non-serving cell in synchronization or out of synchronization with the serving cell of the type 3 UE.

Meanwhile, in the case of the type 1 UE, an NDR gap, that is, an interval in which the PDSCH is not received, may be configured in order to receive a broadcast/multicast message, and detailed description related to this has been described above.

General Device to which Present Invention May be Applied

FIG. 16 is a block diagram of a wireless communication device according to an embodiment of the present invention.

Referring to FIG. 16, a wireless communication system includes a base station (BS) (or eNB) 1610 and a plurality of terminals (or UEs) 1620 located within coverage of the BS 1610.

The eNB 1610 includes a processor 1611, a memory 1612, and a radio frequency (RF) unit 1613. The processor 1611 implements functions, processes and/or methods proposed in FIGS. 1 through 29. Layers of radio interface protocols may be implemented by the processor 1611. The memory 1612 may be connected to the processor 1611 to store various types of information for driving the processor 1611. The RF unit 1613 may be connected to the processor 1611 to transmit and/or receive a wireless signal.

The UE 1620 includes a processor 1621, a memory 1622, and a radio frequency (RF) unit 1623. The processor 1621 implements functions, processes and/or methods proposed in above-described embodiments. Layers of radio interface protocols may be implemented by the processor 1621. The memory 1622 may be connected to the processor 1621 to store various types of information for driving the processor 1621. The RF unit 1623 may be connected to the processor 1621 to transmit and/or receive a wireless signal.

The memory 1612 or 1622 may be present within or outside of the processor 1611 or 1621 and may be connected to the processor 1611 or 1621 through various well known units. Also, the eNB 1610 and/or the UE 1620 may have a single antenna or multiple antennas.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

An embodiment of the present invention may be implemented by various means, for example, hardware, firmware, software or a combination of them. In the case of implementations by hardware, an embodiment of the present invention may be implemented using one or more Application-Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers and/or microprocessors.

In the case of implementations by firmware or software, an embodiment of the present invention may be implemented in the form of a module, procedure, or function for performing the aforementioned functions or operations. Software code may be stored in the memory and driven by the processor. The memory may be placed inside or outside the processor, and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

Mode for Invention

Various forms for implementing the invention have been described in the best mode for implementing the invention.

INDUSTRIAL APPLICABILITY

The method for assisting communication between UEs in a wireless communication system of the present invention has been described on the basis of the example applied to the 3GPP LTE/LTE-A system, but the present invention may also be applied to various wireless communication systems other than the 3GPP/LTE/LTE-A system.

The invention claimed is:

1. A method for a User Equipment (UE) to receive a broadcast/multicast message from a non-serving cell in a wireless communication system, the method comprising steps of:

transmitting reception capability information of the UE to a serving cell;

receiving a physical downlink shared channel (PDSCH) from the serving cell; and receiving a broadcast/multicast message from the non-serving cell, wherein whether the PDSCH and the broadcast/multicast message are transmitted through an identical subframe is determined based on the reception capability of the UE.

2. The method of claim 1, wherein, when the reception capability information of the UE indicates a type 1 indicating that the UE is capable of using a single fast Fourier transform (FFT) chain and a single channel estimation and data decoding chain, the PDSCH and the broadcast/multicast message are transmitted through different subframes.

3. The method of claim 2, further comprising a step of receiving NDR gap configuration information for configuration a non-serving-cell data reception (NDR) gap that is an interval in which the PDSCH is not received from the serving cell.

4. The method of claim 3, wherein the step of receiving the broadcast/multicast message is performed within the NDR gap.

5. The method of claim 4, wherein the NDR gap configuration information indicates a subframe corresponding to the NDR gap in a bitmap form.

6. The method of claim 4, wherein the NDR gap configuration information indicates at least one of a cycle, period or offset of a subframe corresponding to the NDR gap.

7. The method of claim 6, wherein the NDR gap configuration information additionally indicates a system frame number (SFN) of a frame comprising the NDR gap.

8. The method of claim 4, further comprising a step of receiving assistance information comprising:
a cell-identifier (ID) list comprising identification information of the non-serving cell sending the broadcast/multicast message, and/or
a radio network temporary identifier (RNTI) used for decoding of a control channel of the non-serving cell.

9. The method of claim 8, further comprising a step of receiving transmission scheduling information of a broadcast/multicast message through downlink control information (DCI) masked with the RNTI when the assistance information comprising the RNTI is received, wherein the step of receiving the broadcast/multicast message is a step of receiving the broadcast/multicast message transmitted within the NDR gap based on the transmission scheduling information.

10. The method of claim 4, further comprising a step of receiving transmission scheduling information of the broadcast/multicast message from the serving cell, wherein the step of receiving the broadcast/multicast message is a step of receiving the broadcast/multicast message transmitted within the NDR gap based on the transmission scheduling information.

11. The method of claim 1, wherein, when the reception capability information of the UE indicates a type 2 indicating that the UE is capable of using a single fast Fourier transform (FFT) chain and a double or multiple channel estimation and data decoding chain, the PDSCH and the broadcast/multicast message are transmitted through an identical subframe, and the non-serving cell transmitting the broadcast/multicast message is a cell in synchronization with the serving cell.

12. The method of claim 1, wherein, when the reception capability information of the UE indicates a type 3 indicating that the UE is capable of using a double or multiple fast Fourier transform (FFT) chain and a double or multiple channel estimation and data decoding chain, the PDSCH and the broadcast/multicast message are transmitted through an identical subframe, and the non-serving cell transmitting the broadcast/multicast message is a cell in synchronization or out of synchronization with the serving cell.

13. A User Equipment (UE) receiving a broadcast/multicast message from a non-serving cell in a wireless communication system, the UE comprising:
a radio frequency (RF) unit configured to receive a radio signal; and
a processor configured to control the RF unit,
wherein the UE transmits reception capability information of the UE to a serving cell, receives a physical downlink shared channel (PDSCH) from the serving cell, and receives a broadcast/multicast message from the non-serving cell, and
wherein whether the PDSCH and the broadcast/multicast message are transmitted through an identical subframe is determined based on the reception capability of the UE.

* * * * *